(12) United States Patent
Kurenov et al.

(10) Patent No.: US 8,956,165 B2
(45) Date of Patent: Feb. 17, 2015

(54) DEVICES AND METHODS FOR IMPLEMENTING ENDOSCOPIC SURGICAL PROCEDURES AND INSTRUMENTS WITHIN A VIRTUAL ENVIRONMENT

(75) Inventors: Sergei Kurenov, West Falls, NY (US); Juan C. Cendan, Winter Park, FL (US); Jorg Peters, Gainesville, FL (US); Thomas M. Beaver, Gainesville, FL (US); Sukitti Punak, Buffalo, NY (US); William Cance, Orchard Park, NY (US); Kfir Ben-David, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 251 days.

(21) Appl. No.: 12/864,340

(22) PCT Filed: Jan. 26, 2009

(86) PCT No.: PCT/US2009/031963
§ 371 (c)(1),
(2), (4) Date: Jul. 23, 2010

(87) PCT Pub. No.: WO2009/094621
PCT Pub. Date: Jul. 30, 2009

(65) Prior Publication Data
US 2011/0014596 A1    Jan. 20, 2011

Related U.S. Application Data

(60) Provisional application No. 61/023,709, filed on Jan. 25, 2008.

(51) Int. Cl.
*G09B 19/00* (2006.01)
*G09B 23/28* (2006.01)

(52) U.S. Cl.
CPC ................................. *G09B 23/285* (2013.01)
USPC ...................................................... 434/262

(58) Field of Classification Search
USPC .......................................................... 434/262
See application file for complete search history.

(56) References Cited

U.S. PATENT DOCUMENTS

| 5,149,270 A | 9/1992 | McKeown |
| 5,403,191 A | 4/1995 | Tuason |

(Continued)

FOREIGN PATENT DOCUMENTS

| JP | 5303327 | 11/1993 |
| JP | 2004-0344491 | 12/2004 |

(Continued)

OTHER PUBLICATIONS

Basdogan, C. et al., "Haptics in Minimally Invasive Surgical Simulation and Training," *IEEE Computer Graphics and Applications*, Mar./Apr. 2004, pp. 56-64, vol. 24, No. 2.

(Continued)

*Primary Examiner* — Sam Yao
*Assistant Examiner* — Evan Page
(74) *Attorney, Agent, or Firm* — Saliwanchik, Lloyd & Eisenschenk

(57) ABSTRACT

Devices and methods are provided for combining the handle of a surgical instrument with a force feedback generator, able to create resistance to motion similar to that encountered in a real operating environment. The working end of the surgical instrument is recreated in a virtual environment and manipulated by the modified handle through the force feedback generator. Actions of the instrument handle modify a model and display of the virtual environment and transmit a haptic response back to the handle. The devices and methods provide a means for repeatedly performing maneuvers that accurately simulate the actual instrument, but in the virtual environment. The virtual environment is modeled to accurately simulate the use of the instrument including manipulation of and collisions with other virtual objects, such as surgical thread or internal tissues. Training and assessment tools are also provided that coach or assess a user's proficiency with the instrument.

18 Claims, 18 Drawing Sheets

(56) References Cited

U.S. PATENT DOCUMENTS

| | | | |
|---|---|---|---|
| 5,478,344 A * | 12/1995 | Stone et al. ............ 606/144 |
| 5,478,345 A | 12/1995 | Stone et al. |
| 5,480,406 A | 1/1996 | Nolan et al. |
| 5,503,149 A | 4/1996 | Beavin |
| 5,766,016 A * | 6/1998 | Sinclair et al. ............ 434/262 |
| 5,800,179 A | 9/1998 | Bailey |
| 6,038,488 A | 3/2000 | Barnes et al. |
| 6,062,865 A | 5/2000 | Bailey |
| 6,074,213 A * | 6/2000 | Hon ............ 434/262 |
| 6,088,020 A | 7/2000 | Mor |
| 6,113,395 A | 9/2000 | Hon |
| 6,369,834 B1 | 4/2002 | Zilles et al. |
| 6,377,011 B1 | 4/2002 | Ben-Ur |
| 6,396,232 B2 | 5/2002 | Haanpaa et al. |
| 6,417,638 B1 | 7/2002 | Guy et al. |
| 6,529,183 B1 | 3/2003 | MacLean et al. |
| 6,697,043 B1 | 2/2004 | Shahoian |
| 6,810,281 B2 | 10/2004 | Brock et al. |
| 6,857,878 B1 | 2/2005 | Chosack et al. |
| 6,863,536 B1 | 3/2005 | Fisher et al. |
| 6,924,787 B2 | 8/2005 | Kramer et al. |
| 6,939,138 B2 | 9/2005 | Chosack et al. |
| 6,985,133 B1 | 1/2006 | Rodomista et al. |
| 6,991,627 B2 | 1/2006 | Madhani et al. |
| 7,023,423 B2 | 4/2006 | Rosenberg |
| 7,056,123 B2 | 6/2006 | Gregorio et al. |
| 7,236,618 B1 | 6/2007 | Chui et al. |
| 7,261,565 B2 | 8/2007 | Chosack et al. |
| 7,289,106 B2 | 10/2007 | Bailey et al. |
| 2003/0210259 A1 | 11/2003 | Liu et al. |
| 2005/0118557 A1 * | 6/2005 | Sumner et al. ............ 434/118 |
| 2005/0142525 A1 | 6/2005 | Cotin et al. |
| 2005/0181340 A1 | 8/2005 | Haluck |
| 2005/0214727 A1 | 9/2005 | Stoianovici et al. |
| 2005/0221263 A1 | 10/2005 | Vecerina et al. |
| 2005/0277096 A1 | 12/2005 | Hendrickson et al. |
| 2006/0073454 A1 | 4/2006 | Hyltander et al. |
| 2007/0035511 A1 | 2/2007 | Banerjee et al. |
| 2007/0172803 A1 | 7/2007 | Hannaford et al. |
| 2007/0207448 A1 | 9/2007 | Glaser et al. |
| 2007/0275359 A1 | 11/2007 | Rotnes et al. |

FOREIGN PATENT DOCUMENTS

| | | |
|---|---|---|
| WO | WO 01-84530 | 11/2001 |
| WO | WO 2007-068050 | 6/2007 |
| WO | WO 2007-121572 | 11/2007 |
| WO | WO 2008-033541 | 3/2008 |
| WO | WO 2008-058039 | 5/2008 |

OTHER PUBLICATIONS

Brown, J. et al., "Real-time knot-tying simulation," *The Visual Computer*, 2004, pp. 165-179, vol. 20.

Dutta, S. et al., "Simulation: A New Frontier in Surgical Education," *Advances in Surgery*, 2006, pp. 249-263, vol. 40.

Harrington, D.T. et al., "A Time-Cost Analysis of Teaching a Laparoscopic Entero-Enterostomy," *Journal of Surgical Education*, 2007, pp. 342-345, vol. 64, No. 6.

Hubbard, P.M., "Collision Detection for Interactive Graphics Applications," *IEEE Transactions on Visualization and Computer Graphics*, Sep. 1995, pp. 281-230, vol. 1, No. 3.

Kim, M. et al., "Exploiting Graphics Hardware for Haptic Authoring," IOS Press, 2003, pp. 1-6.

Kurenov, S. et al., "Simulation for Training With the AUTOSUTURE™ ENDO STITCH™ Device," *Surgical Innovation*, Dec. 2006, pp. 283-287, vol. 13, No. 4.

Lenoir, J, et al., "Surgical Thread Simulation," *Claim: Proceedings*, Nov. 2002, pp. 102-107, vol. 12.

Liu, A. et al., "A Survey of Surgical Simulation: Applications, Technology, and Education," *Presence: Teleoperators and Virtual Environments*, Dec. 2003, pp. 599-614, vol. 12, No. 6.

Pattaras, J.G. et al., "Comparison and Analysis of Laparoscopic Intracorporeal Suturing Devices: Preliminary Results," *Journal of Endourology*, Mar. 2001, pp. 187-192, vol. 15, No. 2.

Phillips, J. et al., "Simulated Knot Tying," IEEE Int. Conf. on Robotics and Automation, 2002, pp. 841-846.

Scott, D.J. et al., "The Changing Face of Surgical Education: Simulation as the New Paradigm," *Journal of Surgical Research*, 2008, pp. 189-193, vol. 147, No. 2.

Tan, A. et al., "Evaluation of a Novel Modified Suture Material Designed to Facilitate Intracorporeal Knot Tying during Laparoscopic Surgery," *Journal of Endourology*, Nov. 2005, pp. 1104-1108, vol. 19, No. 9.

Wang, F. et al., "Dynamic thread for real-time knot-tying," *Proceedings of the First Joint Eurohaptics Conference and Symposium on Haptic Interfaces for Virtual Environment and Teleoperator Systems*, 2005.

TRUE ASSESSMENT SYSTEM™ (TAS), http://www.e-trinsic.com/secondary_template.asp?section=prodserv&page=assessment, 2002, pp. 1-2.

Ethicon Endo-Surgery, "REALIZE™ Adjustable Gastric Band Product Insert," obtained Dec. 2007, pp. 1-25.

Ethicon Endo-Surgery, "REALIZE™ Adjustable Gastric Band Patient Guide," obtained Dec. 2007, pp. 1-40.

Stylus Adapter Kit for PHANTOM® DESKTOP™ Haptic Device http://www.sensable.com/documents/documents/Stylus_Adaptor_Kit_for_PHANTOM_Desktop.pdf.

SIMBIONIX™, http://www.simbionix.com, obtained Sep. 17, 2008.

SIMBIONIX™, http://www.simbionix.com, obtained Sep. 4, 2008.

Sinclair, M.J. et al., "Computer-simulated Eye Surgery, A Novel Teaching Method for Residents and Practitioners," *Ophthalmology*, Mar. 1995, pp. 517-521, vol. 102, No. 3.

* cited by examiner

FIG. 2A
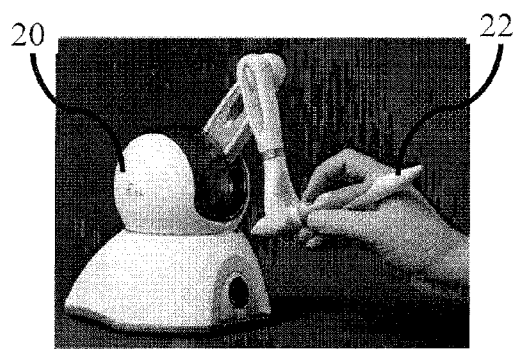
FIG. 2B
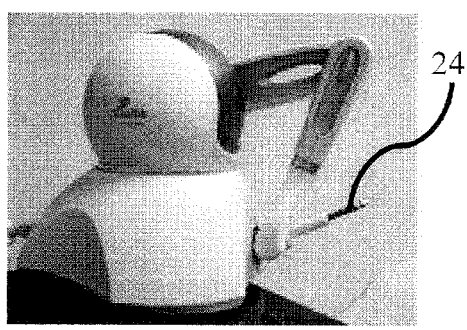
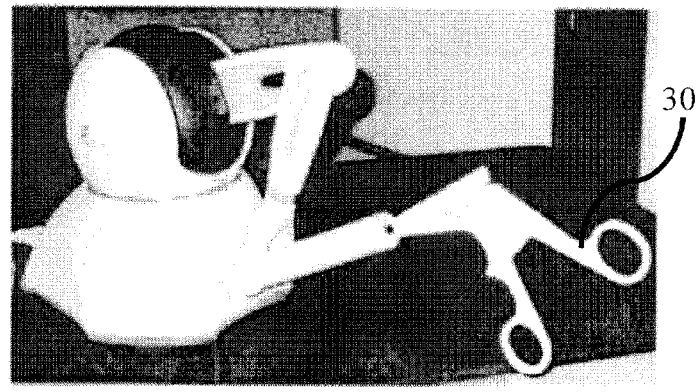
FIG. 2C

DEVICES AND METHODS FOR IMPLEMENTING ENDOSCOPIC SURGICAL PROCEDURES AND INSTRUMENTS WITHIN A VIRTUAL ENVIRONMENT

CROSS-REFERENCE TO RELATED APPLICATION(S)

This application claims the benefit of U.S. Provisional Application Ser. No. 61/023,709, filed on Jan. 25, 2008, which is hereby incorporated by reference in its entirety, including all tables, figures, and references.

BACKGROUND OF INVENTION

Keyhole surgery is a minimally invasive surgical approach that utilizes several small incisions to access the interior of the body. Laparoscopic, thorascopic, and arthroscopic surgeries are examples of specific types of keyhole surgeries in common practice today. Usually, specialized elongated instruments are used to perform these intracorporeal procedures, which are visualized with the aid of an endoscope attached to a light source. Thus, such surgical procedures are also commonly referred to as "endoscopic procedures." Many of these procedures require a variety of such instruments for specific tasks. The use of these instruments in an intracorporeal environment can be a challenging and time-consuming process.

Several training devices and techniques have been developed that can reduce or eliminate the difficulties and time involved with certain procedures, such as grasping, cutting, or dissecting tissues during keyhole surgeries. However, the rapid development and deployment of novel, minimally invasive instruments presents the surgical educator with significant challenges in rapidly developing new training devices. For example, several types of grasping, shearing, and dissecting instruments, such as the ENDO GRASP™, ENDO SHEAR™, and ENDO DISSECT™ instruments (Covidien AG), can be effectively used for a variety of endoscopic procedures. Specialized endoscopic dissectors are often utilized prior to implantation of a gastric band to excise or dissect tissue and can also be used to assist with the implantation of gastric bands (see, for example, the Realize™ adjustable gastric band, Ethicon Endo-Surgery, Inc., (a Johnson & Johnson company)). Other types of endoscopic dissectors that can be utilized in thorascopic surgery are the WOLF™ LUMITIP™ (AtriCure, Inc. West Chester, Ohio), which has a lighted working end, and the CARDIOBLATE® NAVIGATOR™ (Medtronic, Inc., Minneapolis, Minn.), which has a mult-link, lighted working end. The use of all of these instruments often requires skills significantly different from those used for conventional "open cavity" surgery. As such, there can be a significant learning curve involved in developing the necessary skills to efficiently and effectively use these and other new instruments. (Tan, Andrew et al., J. Endourology 2005, 19(9):1104-1108). This is unacceptable in today's medical environment where throughput pressures in the operating room leave little or no time for delays or even minor mistakes. Surgeons, medical professionals, and other trainees must often find ways to perfect their skills outside of the operating room.

In order to achieve proficiency, trainees must be instructed on the correct use of new instruments and spend valuable time practicing the use of the instrumentation. However, maximizing a trainee's proficiency in a limited amount of time, while ensuring patient safety, has also proven to be a challenge. Traditionally, to obtain realistic experience, training has been conducted using actual instruments on excised organs, cadavers, or living animals. This type of training usually requires surgeons to spend time traveling to a training location to engage in practice sessions. Further, to enhance the reality of the training, surgeons often utilize actual instruments during practice, which, of course, become contaminated during use. Because the instruments are usually designed and manufactured for one-time use and cannot be sterilized, each practice session requires opening and using a new instrument. This can be a considerable expense over several practice sessions and with several trainees all using a new instrument each time they engage in training exercises.

With advancements in computer simulations and virtual reality, there are a variety of other methods that have been developed for such practice that can reduce the amount of travel required for training sessions. For example, life-size anatomically correct models, videoscopic trainers, and virtual environment software (SIMBIONIX™) have all been utilized to train surgeons in the use of specific instruments. Most of the simulator devices currently available are designed to train a specific procedure or use of a specific instrument. While many are transportable or at least movable, they are usually large, unwieldy and not designed or amenable to being relocated frequently or over large distances. Further, the cost of such devices usually limits the number available at a facility, necessitating that they be located in a generally accessible location. Thus, medical professionals are still required in most circumstances to travel to another location, even within a facility, to engage in training and practice with such devices. The inconvenience of having to go to another area, move a large device, set up a training session, or wait for an available time to train on a device can all discourage medical professionals from engaging in regular training for new devices.

Virtual reality and computerized environments have also been developed that simulate the intracorporeal surgical environments in which surgeons can develop proficiency with various techniques and instruments. Some of these virtual environments have also utilized haptic feedback devices (SensAble Technologies, Woburn, Mass.; Simbionix™, Cleveland, Ohio) to simulate the feel of touching or interacting with real tissues or organs. (Kim, M., Punak, S., Cendan, J., Kurenov, S., and Peters, J. 2006. Exploiting graphics hardware for haptic authoring. *Medicine Meets Virtual Reality* (*MMVR*) 14, Jan. 25-27 2006, Long Beach, Calif., IOS Press, Amsterdam, Studies in Health Technology and Informatics (SHTI), 2006, 119:255-260; Kim, M., Tianyun, Ni, Cendan, J., Kurenov, S., and Peters, J. A Haptic-enabled Toolkit for Illustration of Procedures in Surgery (TIPS). *Medicine Meets Virtual Reality* (*MMVR*15), Feb. 6-9, 2007, Long Beach, Calif. Studies in Health Technology and Informatics, Volume 125, Pages 209-213, 2007; Hubbard, P., Collision Detection for Interactive Graphics Applications. *IEEE Transactions on Visualisation and Computer Graphics.* 1995; 1, No 3:218-230). But, training in a virtual environment is most effective when it actually emulates real-life situations. Thus, interacting within a virtual environment with devices and techniques that do not have a realistic look and feel of actually used instruments may not provide adequate surgical training and experience. Further, without some type of performance assessment of the training experience, it can be difficult to determine when the skills of a surgeon have developed sufficiently for use in an actual surgical procedure.

There is a need for a more convenient and less time-consuming method by which surgeons or other medical professional trainees can develop the necessary skills to efficiently utilize new and specialized surgical instruments. The ability to use and/or practice improved instruments and techniques would be greatly facilitated if medical professionals could learn and practice using new instruments at times and locations that are available and convenient. An ideal device is one that can be located in close proximity to where a medical professional spends most of their free time, such as in their office or laboratory. It should further be quick to initiate and use, allowing them to obtain needed skills or practice already acquired skills during random free time. Ideally, it would be a device that permits training with several interchangeable input devices, or handles, such that a surgeon need only change the handle and initiate a corresponding computer program to train with a different device. A further need exists to provide realistic training experiences without resorting to the on-going expense of using multiple, actual surgical devices in practice sessions. It should also provide realistically simulated instrumentation and environments for practicing techniques, which can provide surgeons with practical experience and skills. Still further, the ability to assess a surgeon's skills with a particular technique or device can assist in determining when they are sufficiently skilled to use the device in a real life situation.

BRIEF SUMMARY

The subject invention provides systems and related devices useful therewith for educating and training in the use of medical instruments and techniques. More specifically, the subject invention provides computer programs that allow a user to interface with a 3-dimensional interactive virtual environment using modified actual or realistically-simulated medical instruments, or portions thereof, as end effectors or input devices and haptic receiving devices. According to embodiments of the subject invention, the interactions within the virtual environment using modified or simulated surgical instruments are capable of providing the specific look and feel of an actual surgical instrument and its use during a surgical procedure. These interactions allow medical professionals to obtain practical experience and proficiency with instruments and techniques for using them that can subsequently be utilized in different types of actual patient medical procedures. Thus, rather than learning how to perform a specific procedure, the systems and devices of the subject invention can be used to gain proficiency with specific instruments that can be used in a variety of procedures. In further embodiments, the activities and actions of the surgeon while using the instrument or technique are monitored by a computer program and associated algorithms during training to ascertain their proficiency and readiness to utilize the instrument and/or technique on a patient.

Specifically exemplified herein are realistic and accurate simulations of actual instrument working ends in a virtual environment that can be manipulated by the actual or realistically-simulated handle of the corresponding surgical instruments, which are modified to act as input devices for a computer model of the virtual environment. Embodiments of the system of the subject invention utilize actual surgical instruments or accurate models thereof that have been modified for use as input devices for the computer model and tactile receiving devices by attachment to a haptic device, making it possible for surgeons to develop surgical skills and techniques by "touching" and manipulating devices and objects within computerized, 3-dimensional, real-time virtual environments. Advantageously, the devices and methods of the subject invention can be implemented with any of a variety of personal computers and standard, commercial haptic devices.

The subject invention describes various instruments that are used in performing different endoscopic surgeries, which have been modified as input and receiving devices for attachment to a haptic device and computer. The modified instruments allow surgeons to develop specific skills, such as grasping, shearing, dissecting, implant installation, organ or tissue manipulations, knot-tying and other skills within virtual environments. The manipulations of the modified instrument translate to a virtual environment in which the instrument manipulations cause corresponding virtual devices to interact with virtual tissues or other virtual objects. The unique advantage of utilizing a haptic device is the ability of the computer to provide force feedback responses back to the modified instrument that correspond tactilely to the interactions and movements that can be seen on a display device.

Advantageously, surgeons can then utilize their skill with a specific device or technique with many types surgical procedures where such specific skills are useful. For example, dissection and knot-tying skills taught with the embodiments of the subject invention can be utilized with many endoscopic surgical procedures. Thus, with the methods and devices of the subject invention, trainees can develop a repertoire of individual skills that will allow them to accurately and efficiently perform a variety of surgical procedures.

Embodiments of the subject invention can further simulate realistic intracorporeal or in vivo environments on a display device providing surgeons with a more realistic training and/or teaching environment, similar to that in a realistic situation. Utilizing the haptic surgical devices, surgeons and other medical trainees are able to manipulate controls, handles, knobs, levers, switches, etc. of specific haptically-enhanced surgical devices and view the effects of their actions in real-time on one or more computer monitors or other viewing apparatuses, much as they would when viewing a display from an endoscopic camera. The compact size and easy portability of the devices, allow trainees, at any convenient time or place, to practice their grasping, cutting, dissecting, medical implantation, or any of a variety of other techniques on virtual intracorporeal tissues utilizing the haptically-enhanced realistic surgical devices. Further, because the working end of the device and tissues are virtual representations, it is not necessary to utilize and then dispose of actual surgical devices after each practice session.

With the methods of the subject invention, any of a variety of devices, particularly those utilized in endoscopic surgeries can be simulated in a virtual environment. Specifically exemplified herein is a system that incorporates several keyhole surgical devices (hereinafter referred to as "surgical devices") that have been modified for attachment to a PHANTOM OMNI® haptic device (SensAble Technologies). In one embodiment, the ENDO GRASP™, ENDO SHEAR™, and ENDO DISSECT™ (Covidien AG) laparoscopic instruments have been modified and simulated for use with the system of the subject invention. In another embodiment, the REALIZE™ Endoscopic Dissector, which can be utilized to install the REALIZE™ Adjustable Gastric Band (both by Ethicon Endo-Surgery, Inc.), has been modified and simulated for use with the system of the subject invention. In yet another embodiment, the WOLF™ LUMITIP™ endoscopic dissector device has been modified and simulated for use with the system of the subject invention. As demonstrated by the diversity of the devices disclosed herein, it can be seen that numerous other devices from different manufacturers and for different types of surgical procedures can also be utilized with the system and devices of the subject invention. In the embodiments of the subject invention, surgeons are able to manipulate the controls of the haptically enhanced surgical devices and view the effects of their actions on a virtual simulation including the working end of the respective surgical device. In further embodiments, an associated computer program is able to monitor the actions and movements of the virtual working end within the virtual environment and assess the surgeon's skill level with that particular device and/or technique. In further embodiments, the computer program models additional objects in the virtual environment which can include but are not limited to a surgical thread or suture, human or other animal tissue, training apparatus such as an exercise ring, or any number of other objects.

As mentioned above, the computer program associated with the subject invention simulates the virtual working end of a surgical device, as well as 2-dimensional or 3-dimensional virtual tissues or other virtual objects in a virtual environment. The programming utilized allows the virtual working end to interact with the virtual objects and provides force feedback responses correlating to those interactions. Thus, for example, if the virtual working end touches a virtual object, the software will send a haptic response to the modified handle, such that the user will "feel" the contact with the virtual object. In embodiments of the subject invention, associated computer program is enabled to detect collisions between objects in the virtual environment. The computer program may, for example, calculate a resulting force caused by collision between a simulated surgical instrument and another virtual object. In embodiments of the subject invention, a haptic device can then be employed to deliver a corresponding force to the user through a modified or simulated handle of the simulated surgical device.

In further embodiments, the computer program provides performance assessment and coaching pertaining to the interactions of the virtual working end with other virtual objects. The virtual simulations and performance assessments in conjunction with the haptic modified surgical devices provide a more convenient and realistic teaching and training environment that can replace conventional teaching and training techniques.

BRIEF DESCRIPTION OF DRAWINGS

In order that a more precise understanding of the above recited invention be obtained, a more particular description of the invention briefly described above will be rendered by reference to specific embodiments thereof that are illustrated in the appended drawings. Understanding that these drawings depict only typical embodiments of the invention and are not therefore to be considered as limiting in scope, the invention will be described and explained with additional specificity and detail through the use of the accompanying drawings in which:

FIGS. 2A 2B, and 2C are photographs of a force-feedback haptic interface device designed to convey force feedback sensations to a user operating a device in a 3 dimensional (3D) virtual environment (FIG. 2A). The stylus can be removed to reveal a ¼" stereophonic jack (FIG. 2B), to which the modified handle of the surgical device can be connected utilizing a jack connector between the stereophonic jack and the modified surgical instrument handle (FIG. 2C).

FIG. 12B is an enlarged view of the components of the modified handle.

FIG. 25 is a screen image of a report generated by a display device of the subject invention, which provides information regarding a trainee's proficiency with certain knot-tying procedures.

DETAILED DISCLOSURE

Figure 1:
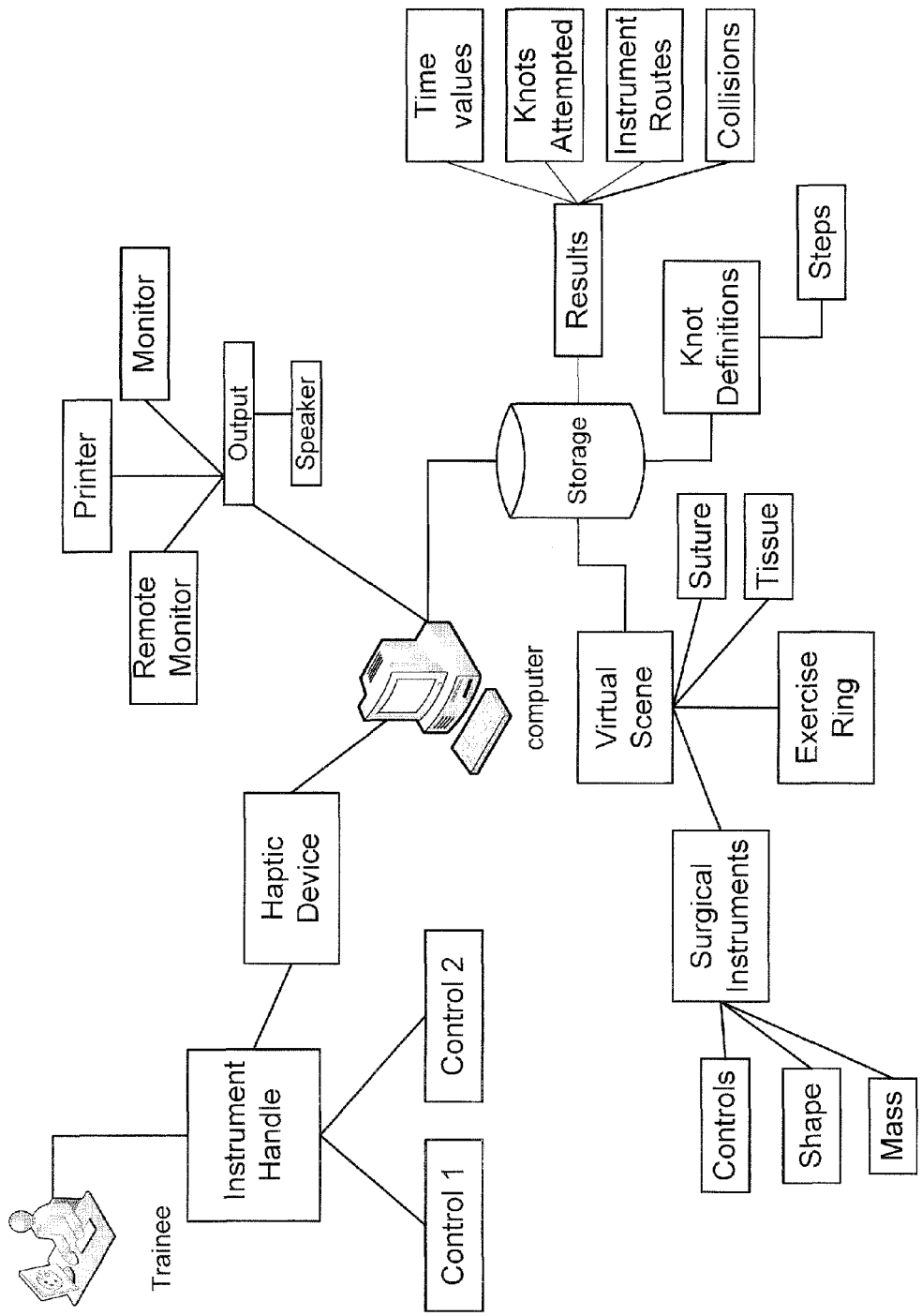
FIG. 1 is a functional overview of a system for implementing an embodiment of the subject invention.

The subject invention is particularly useful in the field of surgical procedures and, in particular, methods and devices used for training and/or assessing the use of keyhole or endoscopic surgical instruments. Specific embodiments disclosed herein include surgical devices for grasping, shearing, or dissecting tissues, such as, for example, the ENDO GRASP™, ENDO SHEAR™, and ENDO DISSECT™ devices; the REALIZE™ Adjustable Gastric Band and associated dissector instrument (Ethicon Endo-Surgery, Inc.); and the WOLF™ Navigator™ tissue dissector (which are hereafter referred to generally as "surgical" devices). However, while the subject application describes a specific use for training and/or teaching the use of endoscopic surgical devices, other modifications apparent to a person with skill in the art and having benefit of the subject disclosure are contemplated to be within the scope of the subject invention.

The terms "surgeon" or "trainee" as used in the subject invention are merely for literary convenience. The terms should not be construed as limiting in any way. The devices, apparatuses, methods, techniques and/or procedures of the subject invention can be utilized by any person desiring or needing to do so and having the necessary skill and understanding of the invention.

Also, as used herein, and unless otherwise specifically stated, the terms "operable communication" and "operable connection" and variations thereof mean that the particular elements are connected in such a way that they cooperate to achieve their intended function or functions. The "connection" can be direct, or indirect, physical or remote.

The term "display device" as used herein refers to any interactive computer or electronic device capable of running the computer programs described, modeling a virtual environment, and manipulating a display signal of an output device, such as a television, monitor, screen, or similar equipment, that presents the virtual objects and virtual working end(s) of the subject invention. In a particular embodiment, the display device of the subject invention comprises any of a variety of devices capable of displaying a 2-dimensional or 3-dimensional image. In a more specific embodiment, a display device of the subject invention is a personal computer with a monitor. It should be understood that a person with skill in the art and benefit of the subject disclosure would be able to determine any of a variety of display devices useful with embodiments of the subject invention. It is contemplated that all such variations fall within the scope of the subject invention. Although the term "display" is used, it should be understood that the term is meant to refer to a device that can function to both create and maintain a model of a virtual scene and to output information about this scene. This output can take on forms other than a visual "display." For example, the output can comprise a print out or voice instructions given through an audio speaker.

The subject application also refers to a "working end" or "working portion" of an instrument. As used herein, these terms refer to the area of the instrument having the functional components used to perform a surgical procedure. As also disclosed herein, the one or more instrument control mechanisms are utilized to manipulate the movements of the working end or working portion.

The subject matter of the subject invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the subject invention is described in detail below with reference to the attached drawing figures, which are incorporated in their entirety by reference herein.

The invention can be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the subject invention.

Specific hardware devices, programming languages, components, processes, protocols, and numerous details including operating environments and the like are set forth to provide a thorough understanding of the subject invention. In other instances, structures, devices, and processes are shown in block-diagram form, rather than in detail, to avoid obscuring the subject invention. But an ordinary-skilled artisan would understand that the subject invention can be practiced without these specific details. Computer systems, servers, work stations, and other machines can be connected to one another across a communication medium including, for example, a network or networks.

As one skilled in the art will appreciate, embodiments of the subject invention can be embodied as, among other things: a method, system, or computer program. Accordingly, the embodiments can take the form of a hardware embodiment, a software embodiment, a firmware embodiment or an embodiment combining software, hardware, and firmware. In an embodiment, the subject invention takes the form of a computer program that includes computer-useable instructions embodied on one or more computer-readable media.

Computer-readable media include both volatile and nonvolatile media, removable and nonremovable media, and contemplate media readable by computers and various other electronic devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. The term is "memory", as used herein, is meant to refer broadly to the use of any or all of these technologies are other means for storing information known in the art or later invented.

The invention can be practiced in distributed-computing environments where tasks are performed by remote-processing devices that are linked through a communications network. In a distributed-computing environment, program modules can be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The signal passing and communication described in this application can take place by any number of means including but not limited to wireless, wireline, and network communication using various protocols and technologies well known in the art. In addition, it is important to note that a signal or communication can be passed through any number of intermediary devices before reaching its destination. The embodiments discussed are not meant to limit the scope of the invention in this way.

The subject invention comprises a system whereby an actual surgical instrument handle, or an accurate model or facsimile thereof, is combined with a virtual recreation of the device's working end being viewable on a display device. Various embodiments of the subject invention include generally: 1. an operable connection between a surgical instrument handle or accurate facsimile thereof and a Haptic device or component, 2. the recreation of the functional or working end portion of the surgical device in a virtual environment, and 3. the creation of an interactive virtual tissue model, and 4. a training and analysis platform. These and other components will be discussed in detail.

Figure 18:
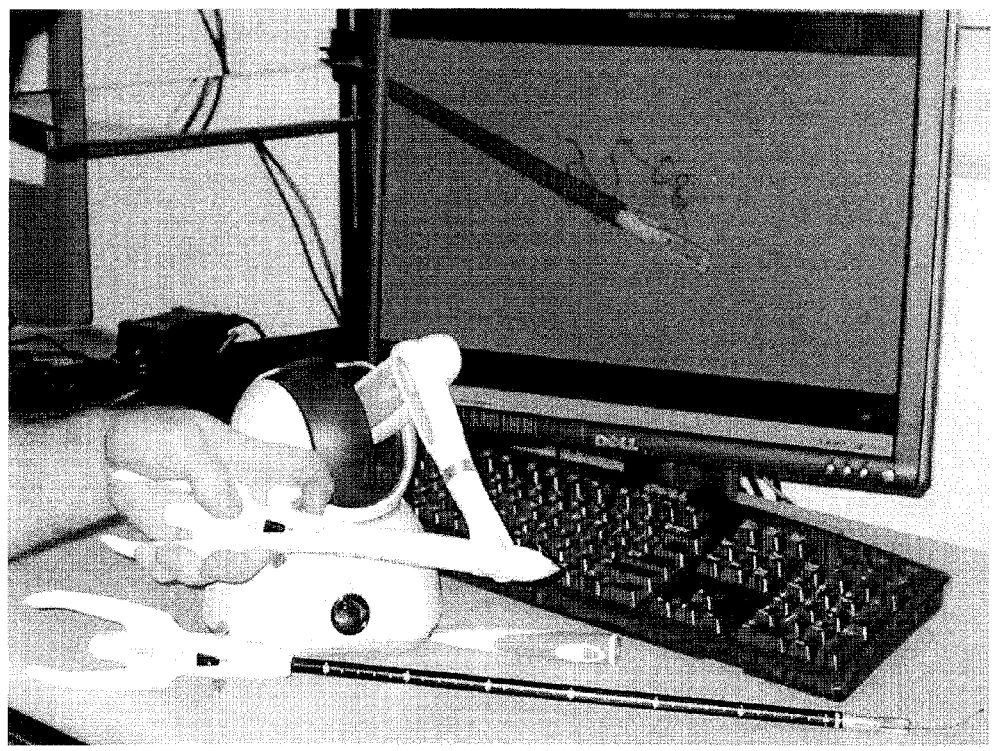
FIG. 18 is a photograph showing an alternative embodiment of the system of the subject invention. In this embodiment, the handle of an Autosuture™ ENDO STITCH™ device (shown on table) has been modified for attachment to a PHANTOM OMNI® desktop haptic device (SensAble Technologies, Woburn, Mass.). A corresponding computer program produces a virtual image of the working end of the surgical device on a display device, such as, for example, a computer screen, as shown, that is manipulated within the virtual environment utilizing the handle controls operably attached to the haptic device. Also shown is a virtual suture with which the virtual working end can realistically interact.

Along with the other attached figures, which show specific embodiments of the subject invention, FIG. 1 provides a functional diagram illustrating an overview of a system embodying the subject invention. Various embodiments of the subject invention can be arranged in a variety of configurations and may not contain all of the components shown in FIG. 1, or may contain additional components. It is also important to note that FIG. 1 presents a functional diagram in which various functions of the invention are labeled as blocks. This description of an embodiment of the invention should not be construed as limiting as various functions such as processing, calculation, data storage, communication, among other functions of embodiments of the subject invention, can be distributed between different devices, either local or remote, or housed within the same device without regard to their appearance in FIG. 1. FIG. 18 shows a photograph of one embodiment of a system which may correspond to the functional diagram presented in FIG. 1.

FIG. 1 shows a Trainee in relation to an Instrument Handle. As discussed above, the Trainee can be any person or user desiring or needing to use the subject invention, but embodiments of the subject invention can be of particular interest to surgeons, surgical residents, and surgical interns. As discussed further below, embodiments of the invention provide training and assessment tools for assessing a user's skill with a particular surgical instrument.

The Instrument Handle can be a modified and/or simulated handle of a surgical or other instrument as described below. See for example the handles depicted in FIGS. 4, 5, 9, and 12. In the embodiment depicted in FIG. 1, two controls are noted in relation to the handle, there can be more or fewer controls. The controls engender the operation of the simulated instrument. Sensors, such as those discussed in relation to FIGS. 4, 5, 9, and 12, can be attached to the handle to sense the operation of the controls. The sensors can then communicate this information to in any number of ways known in the art including but not limited to wireless transmission, over a local or wide-area network, or through a peripheral connection (such as a Universal Serial Bus connection), or the information can be passed through the Haptic Device discussed next.

FIG. 1 also shows a Haptic Device in relation to the Instrument Handle and a computer. In one embodiment, the system includes a haptic device operably connected to a modified surgical device, or portion thereof, such as, for example, the handle, including any control mechanisms associated therewith, or one or more portions thereof, which have been appropriately modified to function as an input and receiving device. Desktop model force feedback haptic devices are well-known in the art and there are several commercially available models that can be utilized with the subject invention. While the subject invention will be described herein with reference to a particular desktop model of a force feedback haptic device, it should be understood that the embodiments of the subject invention could be utilized with other types, models, styles, or sizes of haptic devices, desktop or otherwise, to which the modified surgical devices can be operably attached or coupled.

Particularly exemplified herein is the use of the PHANTOM OMNI® haptic device developed by SensAble Technologies, Inc. (seen in FIGS. 2A, 2B, and 2C) where the stylus is replaced with the modified handle of a surgical device (FIG. 2C), or a handle that adequately approximates that of a particular surgical device. The advantages of using this particular device include the ease of portability, compact size suitable for desktop use, as well as the versatility and ease with which different modified handles of the subject invention can be interchanged on the stylus of the device. As mentioned above, other haptic devices with suitable similar characteristics can also be utilized with embodiments of the subject invention. Alternatively, the modified handles of the subject invention could be used with other larger model haptic devices, such as, for example, life-size models of haptic devices, or other types of non-desktop models of haptic devices. Embodiments of the subject invention include an operable connection between a modified surgical instrument handle or accurate facsimile thereof and the PHANTOM OMNI® device, or other haptic device or components.

The Haptic Device is also shown connected to a computer. Although a desktop personal computer is shown here, as discussed above, the computer can be in any number of forms. The functions of the computer could also be distributed across multiple computers or multiple devices on a wireless or wireline network. In the embodiment presented here, the computer receives input from the Haptic Device which can include but is not limited to the position and orientation of the Instrument Handle. In further embodiments of the subject invention, the computer can also transmit information to the Haptic Device such as the orientation and magnitude of a force to be generated and applied to the Instrument Handle.

The computer is also shown here in connection with a Storage device. The Storage device can comprise various media as discussed above and can be distributed over several different media in several different locations, including in the computer itself, attached to the computer, or accessible via a wireless or wireline network. The computer can maintain and store a Virtual Scene in the Storage device, which can include various surgical instruments, and other objects as shown. The Virtual Scene can be a 2 or 3 dimensional, or other graphical representation of the simulated objects. The Storage can also be used to store definitions and descriptions of various other objects which can appear in the Virtual Scene. For example, the Storage can be used to store information about the operation of a Surgical Instrument's controls, such as Control 1 and 2, as well as an interface to the sensors which can be designed to sense the operation of the controls.

The Storage can also support various training and assessment functions discussed below. For example, it can store information related to various Knots that can be tied including the Steps that make up the knots. The Storage can also be used to save information related to the results of the operation of the system. For example, it can store Instrument Routes including a record of the movement signals received from the Haptic Device during the operation of the simulated instrument. The Storage can also store various time values used to assess the Trainees skill with the simulated instrument. For example, the start and completion times for a particular knot or the amount of time spent in a various efficiency area as further discussed below.

The computer is also attached to various Output devices which can be used to present information to the Trainee or other persons with regard to the simulation. For example, the Virtual Scene can be rendered as 3D graphics and be presented to the Trainee on a computer monitor as shown in FIG. 18. This or different information can also be presented to other persons via, for example, a remote display. In another embodiment, an audio speaker can be used to provide Output. For example, voice instructions or coaching can be provided to the Trainee through such a speaker. Information can also be presented in the form of a print out. For example, the results of the operation can be presented in a table similar to that shown in FIG. 25, among other formats.

Further detailed embodiments of the invention, including devices, media, and methods embodying the subject invention, are discussed below.

I. Operable Connection Between a Haptic Device and a Modified Surgical Device

The subject invention provides methods for the modification of actual surgical devices or sufficiently accurate models or facsimiles thereof, for use as input devices for display devices. In one embodiment of the subject invention, the handle, including any control mechanisms associated therewith for manipulation of a surgical device, is modified as an input device, so that the manipulations of the surgical device and/or the one more control mechanisms that would normally affect the working end of the device are translated into information, such as, for example, one or more signals, that are transmitted to a display device. In a specific embodiment, the one or more signals are electrical signals transmitted to a connecting apparatus by an operable connection. The information receiving connecting apparatus can be operably connected to a haptic device that can then transmit the information to the display device. In a more specific embodiment, the surgical device is modified for use with a haptic feedback device that is operably connected to a display device with associated programming to control the haptic feedback device.

An alternative embodiment utilizes haptic components incorporated as part of the modified surgical device eliminating the need for a separate haptic feedback device. In these embodiments, a user is able to interface with a display device using a surgical device to experience a virtual reality simulation of a surgical procedure or other technique.

In a further embodiment, the display device transmits response signals or response information to the haptic device that correlate to the interactions and changes within the virtual environment and/or changes to the visual display brought about by the virtual working end. By way of a specific example, an instrument handle, as described above, operably connected to a haptic device can be used to transmit signals or instructions to a display device that correspond to the operation of the virtual working end. The virtual working end can be utilized to interact with other virtual objects, such as, for example, virtual tissues, organs, or devices, within the virtual environment. Response information or response signals that correspond to the effects of the changes to the virtual environment interactions can then be transmitted to the haptic device via the computer. The haptic device can respond by presenting to the handle appropriate and corresponding tactile responses. Thus, a trainee using the handle would receive tactile feedback similar or identical to the tactile feedback of an actual surgical technique or procedure.

In one embodiment, depicted in FIGS. 2A-C, a PHANTOM OMNI® Haptic Device (SensAble Technologies, Woburn, Mass.) 20, a force feedback haptic device, is utilized with the subject invention (FIG. 2A). The PHANTOM OMNI® 20 normally utilizes a stylus 22 affixed to a stereophonic ¼" jack 24 (FIG. 2B) as the normal mode of input. However, in this embodiment of the subject invention, the original user-interfacing stylus 22 is replaced with the modified handle of a surgical instrument operably connected to the ¼" jack 24.

In a further embodiment, the surgical device or some part thereof, such as, for example, the handle and/or the control mechanisms, is modified with one or more of any of a variety of sensing devices, such as, for example, microswitches, motion sensors, step actuators, slide switches, pressure switches, biometric sensors, or other devices known to those with skill in the art that are capable of transmitting to the jack 24 information, such as, for example, one or more signals, that correspond to the manipulations of the handle and/or components or control mechanisms thereof. In other embodiments, optical detectors such as lasers, fiber optics, or photodetectors can be utilized with the device of the subject invention. In still further embodiments, radio frequency signal(s) can be used to transmit information from the sensing device to a haptic device.

Figure 3:
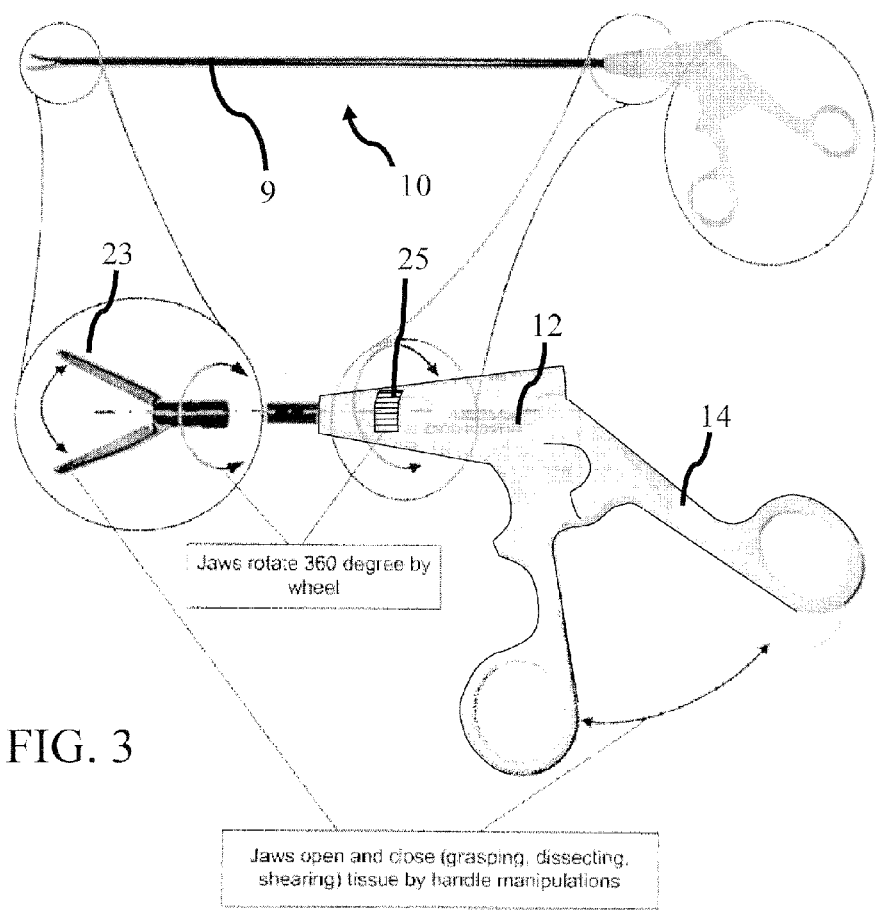
FIG. 3 illustrates the operation of a typical dissecting surgical device that can be modified for attachment to a haptic device. Specifically shown is the ENDO DISSECT™ in the "neutral" jaws open position. The position of the jaws is controlled by the handle and the jaws can be rotated by the wheel located on the handle.

In specific embodiments of the subject invention, the modified handle of a surgical device comprises any of a variety of switches and circuits, known to those with skill in the art, to translate the mechanical manipulations of the control mechanisms of the device, e.g., the squeezing of the handle arm 14 or rotation of the working end by turning a dial 25 on the ENDOGRASP™ device depicted in FIG. 3, into electrical signals. In a further embodiment, one or more micro-switching circuits, known to those with skill in the art, are utilized to translate the mechanical manipulations into electrical signals. In a still further embodiment, the micro-switches are further operably connected to a signal receiving connecting apparatus. In a specific embodiment, the signal receiving connecting apparatus is a jack connector, which is known to those with skill in the art. In a further specific embodiment, the microswitches or other sensing devices are operably connected to a jack connector, which is known in the art and capable of operable connection to a stereophonic jack.

Alternative embodiments can utilize any of a variety of techniques and devices for transmitting one or more signals to the haptic device. For example, in one embodiment, the signal receiving connecting apparatus can utilize optical detectors such as lasers, fiber optics, or photodetectors can be utilized with the device of the subject invention. Alternatively, radio frequency signal(s) can be used to transmit information from a micro-switch to a haptic device.

In an alternative embodiment, the haptic elements of the system can be incorporated with the handle of a modified surgical device, or a handle that adequately approximates that of a surgical device. In this embodiment, the modified handle can be operably connected to the display device. As further discussed below, the display device can utilize a computer program which models the virtual environment and provides force feedback information to the haptic device that can provide a tactilely discernable effect to the modified handle. Thus, for example, if a trainee using the modified handle "touches" a virtual object with a virtual working end, the display device will show the working end in contact with the object and transmit one or more signals to the haptic device that cause the handle to "feel" appropriate pressure or sensations as if the device were actually contacting the object.

In a still further embodiment, the information transmitted to the modified handle and the haptic response thereto coincides with the display of the working end, e.g., grasping jaws, lighted end, etc., of the device on the display device. Thus, in this embodiment, manipulations of the handle can transmit information to the display device that causes a modification of the display of the device's working end thereon. The display device can also transmit information to the modified handle pertaining to the display of the working end, or changes thereto. The information transmitted to the modified handle can cause a haptic response that coincides with the display of the working end on the display device.

Most of the surgical devices that can be utilized with the subject invention can provide for a 360° rotation of the working end by rotation of the entire device, or by use of various components, such as for example, dials, levers, or other means. The PHANTOM OMNI® haptic device, and most other similar haptic devices, are capable of detecting rotation through a jack, such jack 24 in FIG. 2B, or by other means, for example, by rotation of the actuator arm. Therefore, in one embodiment of the subject invention, with proper operable connection to the jack, it is not necessary to utilize a separate sensor, switch, indicator, or other device to detect the rotation of the device. However, the PHANTOM OMNI® haptic device has a detectable range of rotation of 270°. In a virtual surgical procedure, a 270° range of rotation is usually adequate for practice and training purposes. But, in an alternative embodiment, haptic feedback devices that provide a full 360° of rotation can be used with various embodiments of the subject invention.

Following are specific examples that describe, in conjunction with the attached figures, the procedures for practicing the subject invention. These examples are provided for the purpose of illustration only and should not be construed as limiting. Thus, any and all variations that become evident as a result of the teachings herein or from the following examples are contemplated to be within the scope of the subject invention.

A. ENDO GRASP™, ENDO SHEAR™, and ENDO DISSECT™ Virtual Instruments

Figure 4:
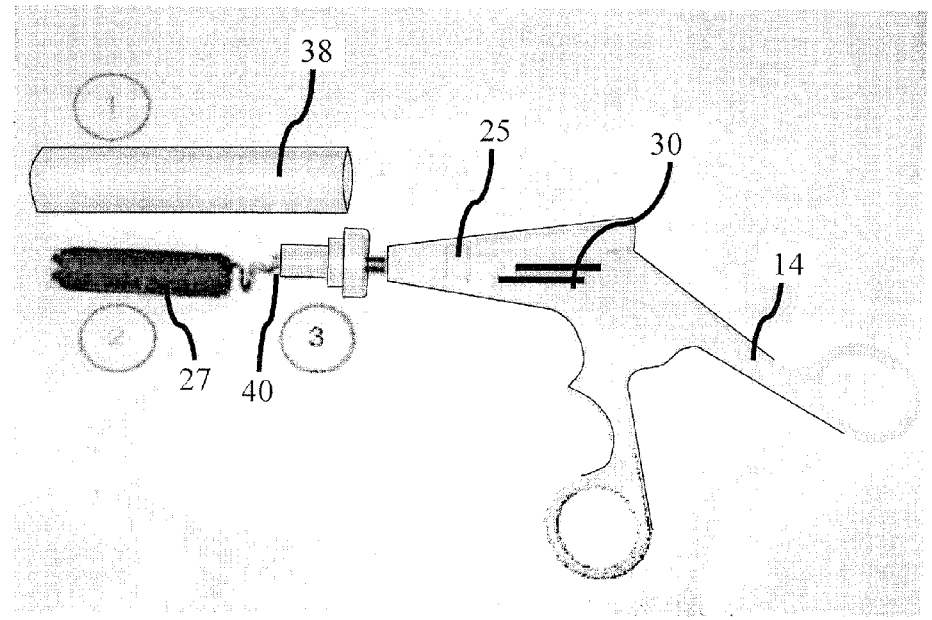
FIG. 4 is a photograph of one embodiment of a modified surgical device of the subject invention. Shown is the ENDO DISSECT™ with a connecting cover (1), the ¼" stereophonic jack connector (2) and the modified handle with assembled microswitch (3).

In this embodiment, as depicted in FIG. 4, the modified handle 3 of an ENDO GRASP™, ENDO SHEAR™, or ENDO DISSECT™ device (hereinafter "Endo devices") can be used to replace the stylus on a PHANTOM OMNI® Haptic Device (FIG. 2C). The modified handle 30, which includes the associated control mechanisms thereon, translate the critical instrument maneuvers of positioning the working end 23 (i.e., jaws of this device shown in FIG. 3) in open or closed stages, advancing and retracting, and rotating the device into signals that can be received by the haptic device through, for example, the jack 24 of FIG. 2B, and transmitted to a display device for interpretation into a visual representation on a monitor. In a further embodiment, the display device can transmit one or more signals or information to the haptic device corresponding to the visual representation, causing the haptic device to present to the modified handle a tactile sensation. In a further embodiment, the tactile sensation is presented in real-time. In a still further embodiment, the tactile sensation is similar or identical to the tactile sensation received during an actual or real procedure.

In an embodiment of the subject invention, the modified handle 30 of the surgical device comprises any of a variety of sensing devices, including, for example, switches, pressure sensors, biometric sensors, circuits, or other sensing devices known to those with skill in the art, to translate the mechanical manipulations of the device, e.g., the squeezing of the handle arm 14 and/or the rotation of the jaw 23 by turning a dial 25, into electrical signals. In a further embodiment, one or more micro-switching circuits 40, known to those with skill in the art, are utilized to translate the mechanical manipulations into electrical signals. In a still further embodiment, the micro-switches are further operably connected to a jack connector, which are known in the art and capable of operable connection to a stereophonic jack.

In general, operation of the Endo devices can be controlled by squeezing the handle and/or turning the dial. The working end 23, i.e., jaws, is biased in an open position, which requires squeezing the handle of the device to close the jaws for dissecting, shearing or grasping tissues. To change the position of the jaws relative to a tissue necessitates physically moving the handle by advancing or retracting it and/or turning the dial 25 in the handle to rotate the shaft 27. Thus, the jaws of the device can demonstrate up to 6 degrees of rotational freedom, as well as, another degree of positional sensing freedom providing by the position of the jaws, either open or closed. Thus, the device of the subject invention can realize up to 7 degrees of freedom.

Therefore, in a specific embodiment of the subject invention, shown for example in FIG. 4, the elongated shaft 9 of FIG. 3 and the retracting blade contained therein (not shown) that controls the opening and closing of the jaws 23 are removed or cut approximately 1.0" to approximately 4.0" from the handle. The handle is then modified with at least one microswitch positioned so that the squeezing of the handle arm 14 is translated into one or more signals that can be received and interpreted by a display device. Therefore, in one embodiment, at least one microswitch is fixedly positioned in or on the handle and/or the elongated housing 9 so that the motions, such as squeezing of the handle arm 14, can trigger the microswitch 40. In a specific embodiment, at least one microswitch 40 is operably connected with the truncated retractor blade (FIG. 4). There are any of a variety of microswitches, known to those with skill in the art, that could be utilized with the subject invention, such as, for example, a Panasonic® Detector Switch, or similarly functioning device. In one embodiment, the microswitch can be positioned at an appropriate position relative to the retractor blade by use of a switch-to-shaft connector 32 that can be positioned over the truncated end of the elongated shaft 34, as shown, for example, in FIGS. 4 and 5. In this embodiment, the movement(s) of the retractor blade can trigger the microswitch 40 and translate the motion through a stereo jack connector 27 (FIG. 5), which is operably connected to the ¼" stereophonic jack 24 on the haptic device (FIG. 2B), to a display device. A connecting cover 38 can be used to maintain the position of the jack connector 27 with the truncated end of the elongated shaft 34 and secure the modified handle to the haptic feedback device, as shown, for example, in FIG. 2C.

As illustrated by the example depicted in FIG. 3, in an Endo surgical device 10 the motion of the retractor blade is initiated and controlled by squeezing the handle arm 14, which pulls the retractor blade (not seen) into the handle 12. In normal operation, as the retractor blade is pulled or drawn into the handle, the jaws 23 are forced close. As shown in FIG. 4, these motions can be translated into a signal in the modified handle device 30 by the utilizing one or more microswitches, known to those with skill in the art. Thus, in one embodiment, at least one microswitch 40 is fixedly attached to the truncated end of the elongated housing 9 (FIG. 3), such that the motion of the truncated retractor blade, caused by squeezing the handle arm 14, triggers the microswitch 40, which translates the motion into a signal that can transferred to a display device on which the effect caused by the handle manipulations cause an effect on a virtual model of the working end 23. In a further embodiment, the display device can transmit appropriate haptic responses to the PHANTOM OMNI® device. Thus, a surgeon manipulating the handle and interacting with a virtual tissue or object can receive tactile sensations from the PHANTOM OMNI® device that mimic the interactions and sensations that would occur when manipulating the device with actual or real tissues or objects.

The transmission of the microswitch signal from the modified surgical instrument handle 30 to the PHANTOM OMNI® haptic device 20 can be accomplished by a variety of methods and devices known to those with skill in the art. For example, the switches can be hardwired to the PHANTOM OMNI® device for permanently affixing the modified surgical instrument handle 30 or other similar end effector device. Alternatively, any of a variety of jack connectors and adaptors can be used to operably connect the modified handle to the PHANTOM OMNI® device, or other haptic device utilized with the subject invention. The signal can also be communicated to the display device without first passing through the PHANTOM OMNI® device, for example by means of a separate wired or wireless connection. Any suitable communication means known in the art can be employed.

Figure 5:
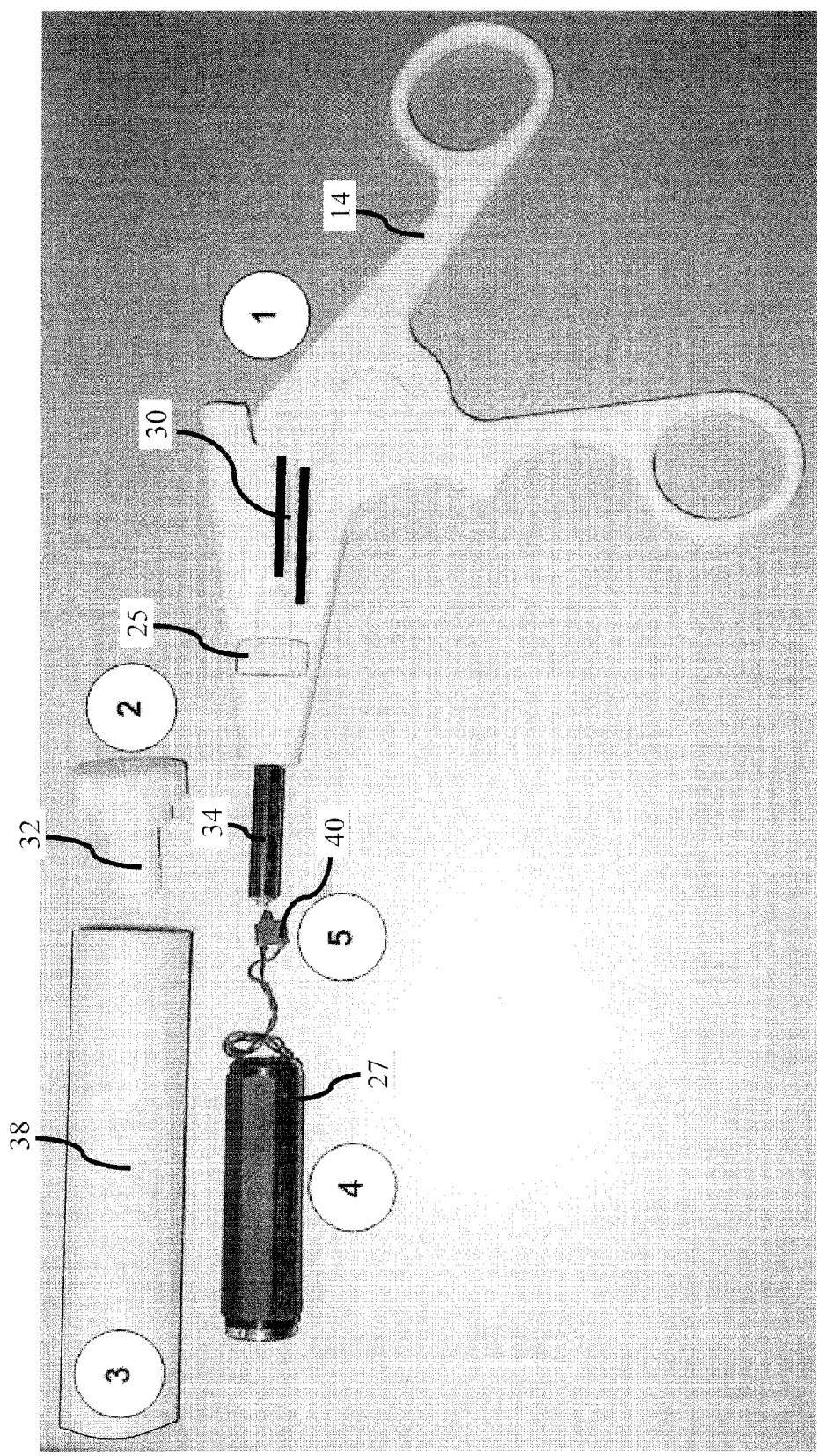
FIG. 5 is a photograph of a disassembled modified handle of the embodiment shown in FIG. 4. Shown is (1) a modified handle from a grasping, shearing or dissecting surgical device, (2) a switch-to-shaft connector, (3) connecting cover, (4) a jack connector or adaptor, and (5) a microswitch wired to the jack connector.

In a further embodiment, the handle is operably attached such that it can be easily interchanged with other modified instrument handles or facsimiles thereof. It can be seen in FIG. 2B that the PHANTOM OMNI® device stylus 22 can be removed to expose a ¼" stereophonic jack plug 24. To connect the modified surgical instrument handle 30 to the PHANTOM OMNI® device 20 usually requires forming an operable connection to the ¼" stereophonic jack plug 24 of the PHANTOM OMNI® device (FIG. 2C). While many techniques or methods can be employed to make such a connection, the PHANTOM OMNI® device is designed with a ¼" jack plug to facilitate such attachments. Thus, in a specific embodiment, the one or more microswitches are operably connected to a jack connector 27, for example, as shown in FIGS. 4 and 5. Any of a variety of jack connectors known in the art could be utilized with the subject invention. A person with skill in the art would be able to determine the appropriate type and size of jack connector necessary to establish connection with the ¼" jack plug of the PHANTOM OMNI® device 20, or other haptic device. Alternatively, if the jack connector is not compatible with the ¼" jack plug, a jack plug adaptor could be used to connect the modified handle to the jack of the PHANTOM OMNI® ¼" jack plug 24, or other haptic device. Jack adaptors are well known in the art and are utilized to connect numerous types and sizes of jack connectors.

Further, as mentioned above, any of a variety of connecting covers 38, such as the ones shown, for example, in FIGS. 2C, 4 and 5, can be used to secure the jack connector and the modified handle. A person with skill in the art would be able to devise a variety of devices and techniques for securely positioning the elements of the modified handle and such variations are considered to be within the scope of the subject invention.

B. Realize™ Endoscopic Dissector and Adjustable Gastric Band Instruments

Figure 6:
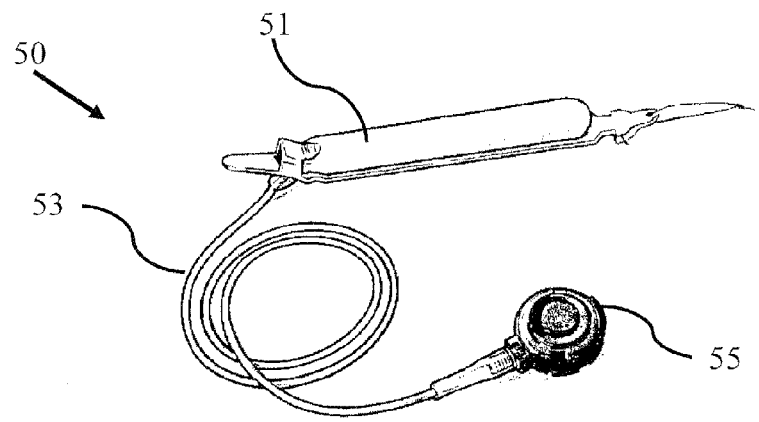
FIG. 6 is an illustration of a REALIZE™ Adjustable Gastric Band that can be installed with the associated REALIZE™ Endoscopic Dissector.

As shown in FIG. 6, The Realize™ Adjustable Gastric Band 50 is a laparoscopically implanted medical device for the treatment of morbid obesity. The band is installed around the upper stomach to form an artificial stoma, limiting the amount of food that a patient can consume. The band comprises a reinforced balloon 51 with attached tubing 53. The band is manufactured in one size that can be altered as necessary by increasing or decreasing the amount of fluid in the balloon component utilizing the tubing through an injection port 55.

Figure 7:
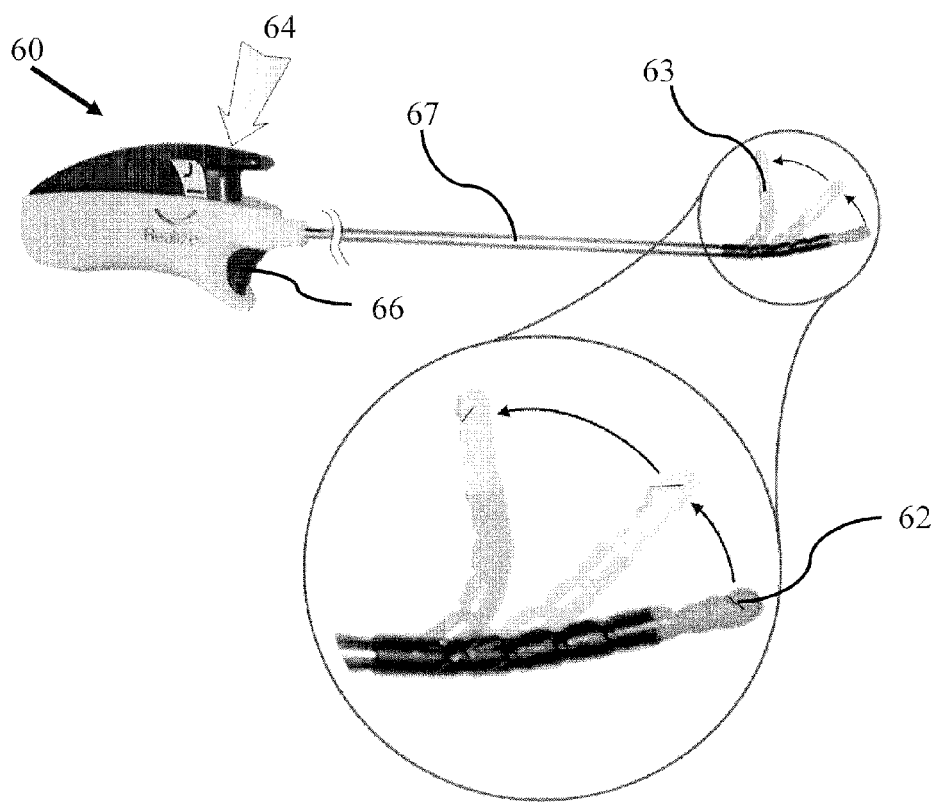
FIG. 7 is a photograph showing the normal operation of the working end of a specialized endoscopic fat tissue dissector (REALIZE™ by Ethicon Endo-Surgery, Inc.), as disclosed in one embodiment of the subject invention.

Installation of the band 50 is facilitated with the Realize™ Endoscopic Dissector 60, seen, for example, in FIG. 7. The dissector 60 is utilized to bluntly dissect a circumferential space around and/or under blind or poorly visualized areas, such as, in this example, the backside of the upper stomach. The dissector 60 can be bent in successive steps allowing the surgeon more control during the dissection process. Once the tip of the dissector is accessible around the tissue or organ, a suture around one end of the gastric band is looped over a suture slot 62 at the end of the Endoscopic Dissector. As the Endoscopic Dissector is retracted, it pulls and positions the gastric band around the stomach, allowing the two ends to be joined to complete the constriction around the stomach.

Figure 8:
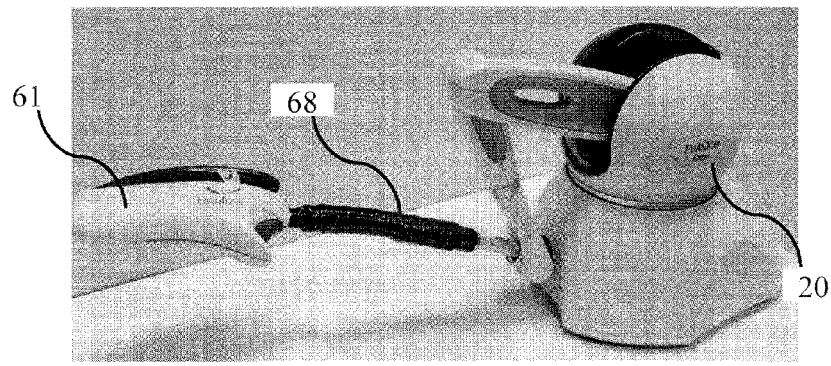
FIG. 8 is a photograph of a modified handle of the dissector shown in FIG. 7 operably attached to a haptic device (PHANTOM OMNI® desktop haptic device (SensAble Technologies, Woburn, Mass.).

As shown in FIG. 8, the modified handle 61, including any control mechanisms associated therewith, of the Realize Endoscopic Dissector device (hereinafter "dissector") can be used to replace the stylus on the ¼" jack 24 of a PHANTOM OMNI® Haptic Device 20. The modified handle 61 translates the critical instrument maneuvers of positioning the working end 63 (i.e., blunted tip of this device) in progressively more or less curved or bent stages, advancing and retracting, and rotating the device into signals that can be received by the haptic device through the jack 24 and transmitted to a display device for interpretation into a visual representation.

Figure 9:
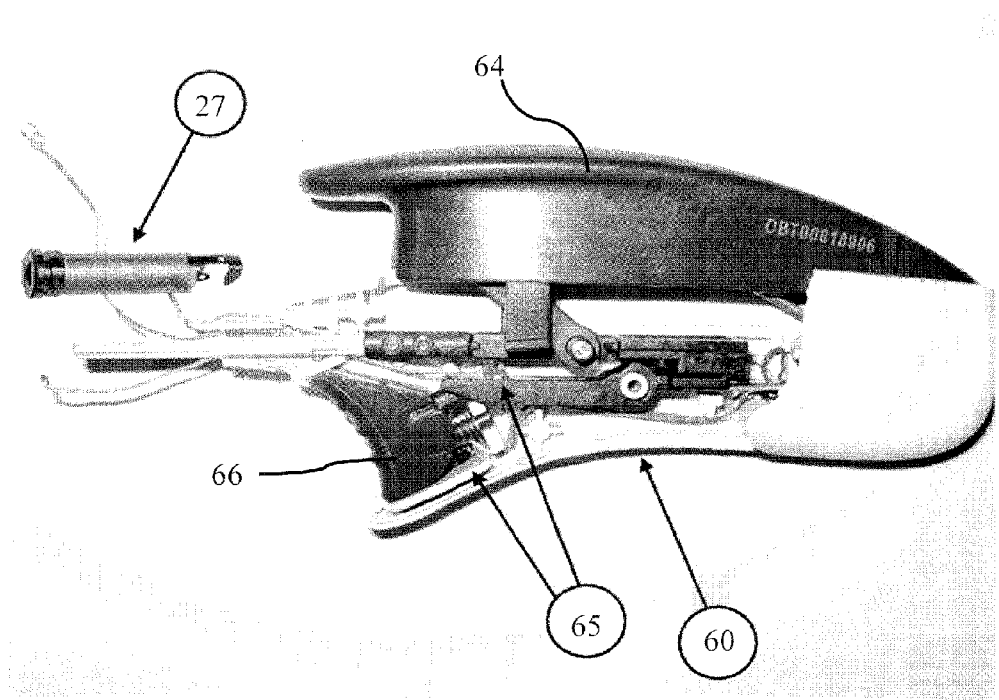
FIG. 9 is a photograph of one embodiment of a modified handle of the dissector shown in FIG. 7. Shown in this embodiment are the disassembled components and placement of microswitches and a jack connector in the modified handle.

As shown in FIG. 9, in an embodiment of the subject invention, the modified handle 61 of the dissector comprises any of a variety of switches, sensors, circuits, or other sensing devices known to those with skill in the art, to translate the mechanical manipulations of the dissector 60, e.g., stepwise compression of the handle arm 64, pulling of a release trigger 66, and rotation of the blunt end 63, into electrical signals. In a further embodiment, one or more micro-switching circuits 65, known to those with skill in the art, are utilized to translate the mechanical manipulations into electrical signals. In a still further embodiment, the micro-switches are further operably connected to a jack connector, which is known in the art and capable of operable connection to a stereophonic jack.

During a procedure, the operation of the dissector working end 63 can be controlled by compressing the handle arm, causing a ratchet and pawl mechanism to retract an elongated blade (not seen) within the elongated shaft 67 that forces the blunt end to gradually bend to a maximum angle of approximately 100°, as seen in FIG. 7. Pulling or otherwise activating the release trigger 66 disengages the internal pawl mechanism allowing the biased blunt tip to straighten. Thus, the working end 63, i.e., the blunt end, being biased in a straightened position, requires squeezing the handle arm 64 of the device to bend the tip for dissecting around an organ or other internal structure. To change the position of the blunt tip relative to a tissue or organ necessitates physically moving the handle by advancing or retracting it and/or turning the handle to rotate the shaft 67. Thus, the working end of the device can demonstrate up to 6 degrees of rotational freedom, as well as, another degree of positional sensing freedom provided by the position of the blunt end, either bent or straight. Thus, the device of the subject invention can realize up to 7 degrees of freedom.

Therefore, in a specific embodiment of the subject invention, shown for example in FIG. 9, the elongated shaft 67 and the retracting blade contained therein (not shown) that controls the bending of the blunt tip 63 are removed approximately 1.0" to approximately 4.0" from the handle. The handle is then modified with at least one microswitch positioned so that the squeezing of the handle arm 64 can be translated into one or more signals that can be received by a display device. Therefore, in one embodiment, at least one microswitch is fixedly positioned in or on the handle and/or the elongated shaft 67, so that the motions, such as squeezing of the handle arm 64 or pulling the release trigger, can activate the microswitches 65. Any of a variety of microswitches, known to those with skill in the art, could be utilized with the subject invention, such as, for example, a Panasonic® Detector Switch, or similarly functioning device. In a specific embodiment, at least one stepped microswitch 65 is operably connected to the handle arm, whereby consistent pressure applied to the handle arm 64 triggers the microswitch in steps, similar to the ratchet and pawl described above, which is interpreted and displayed by the display device as increased bending of the blunt tip. In this embodiment, the movement(s) of the retracting blade can trigger the microswitch 40 and translate the motion through a stereo jack connector 68 (FIG. 8), which is operably connected to the ¼" stereophonic jack 24 on the haptic device (FIG. 2B), to a virtual model. A connecting cover, as described previously, can also be used to maintain the position of the jack connector 27 with the truncated end of the elongated shaft 67 and secure the modified handle to the haptic feedback device, as shown, for example, in FIG. 8.

In normal operation of the Realize™ Endoscopic Dissector device 60, the motion of the retracting blade (not seen) is initiated and controlled by squeezing the handle arm 64, which retracts the blade (not seen) into the handle 60. As the blade is retracted within the shaft 67, the working end is forced to bend. These motions can be translated into a signal in the modified handle device 60 by utilizing one or more microswitches 65, known to those with skill in the art. Thus, in one embodiment, at least one microswitch is operably connected to the handle arm 64, such that the motion of the truncated retracting blade, caused by squeezing the handle arm 64, triggers the microswitch, which translates the motion into a signal that can transferred through the PHANTOM OMNI® haptic device to a display device. The display device presents a virtual model of the working end 63 and interprets the microswitch signals so as to modify the virtual model display accordingly. In a further embodiment, the display device can transmit appropriate haptic responses to the PHANTOM OMNI® device. Thus, a surgeon manipulating the handle and interacting with a virtual tissue or object can receive tactile sensations from the PHANTOM OMNI® device that mimic the interactions and sensations that would occur when manipulating the device with actual or real tissues or objects.

As discussed above, the transmission of a microswitch signal from the modified surgical instrument handle to the PHANTOM OMNI® haptic device can be accomplished by a variety of methods and devices known to those with skill in the art. For example, the switches can be hardwired to the PHANTOM OMNI® device for a permanently operable connection to the modified surgical instrument handle 60 or other similar end effector device. Alternatively, any of a variety of jack connectors and adaptors can be used to operably connect the modified handle to the PHANTOM OMNI® device, or other haptic device utilized with the subject invention. In a further alternative embodiment, the operable connection between the modified handle and the haptic device is removable, such that modified handles of different devices are easily interchangeable with the haptic device.

As mentioned previously, the PHANTOM OMNI® device stylus 22 can be removed to expose a ¼" stereophonic jack plug 24. To connect the modified dissector handle 60 to the PHANTOM OMNI® device 20 usually requires forming an operable connection to the ¼" stereophonic jack plug 24 of the PHANTOM OMNI® device (FIG. 2C). While many techniques or methods can be employed to make such a connection, the PHANTOM OMNI® device is designed with a ¼" jack plug to facilitate such attachments. Thus, in an embodiment, the one or more microswitches are operably connected to a jack connector 27, for example, as shown in FIG. 9. As discussed above, any of a variety of jack connectors and connecting covers known in the art could be utilized with the subject invention.

C. WOLF™ LUMITIP™ Lighted Dissecting Pen Instrument

The WOLF™ LUMITIP™ lighted Dissecting Pen (AtriCure, Inc.) 70 (hereinafter "pen") is an endoscopic surgical device that facilitates blunt dissection of a circumferential space around and/or under blind or poorly visualized areas. As seen in the examples shown in FIGS. 10 and 11, a light source 72 is contained in the working end 73 that can visually assist the surgeon during a procedure. The working end 73 of the pen 70, located on an elongated shaft 77, can be bent in successive steps by turning a dial 74 on the handle 75, allowing the surgeon precise control during the dissection process. Once the working end of the pen is accessible around the tissue or organ, such as shown, for example, in FIG. 11, various accessory devices can be installed through the dissected opening and, if desired, the pen can assist with positioning other devices.

Figure 12:
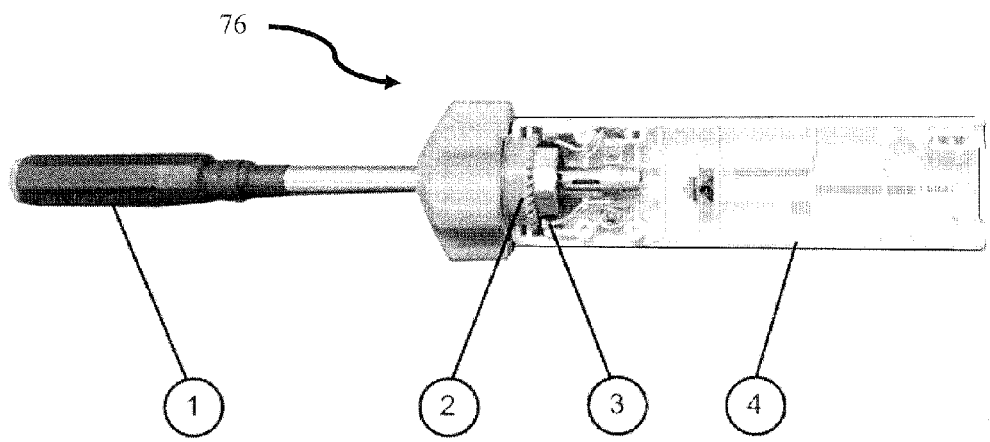
FIGS. 12A and 12B are photographs of one embodiment of a modified handle of the dissector shown in FIG. 10. Shown in this embodiment are the disassembled components and placement of microswitches and a jack connector in the modified handle.
Figure 13:
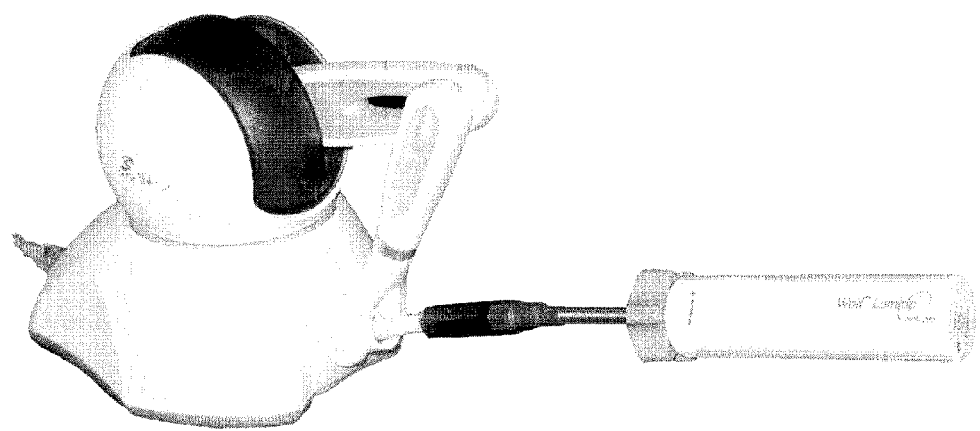
FIG. 13 is a photograph of the modified handle of the dissector shown in FIG. 12 operably attached to a haptic device (PHANTOM OMNI® desktop haptic device (SensAble Technologies, Woburn, Mass.).
Figures 14A, 14B, 14C:
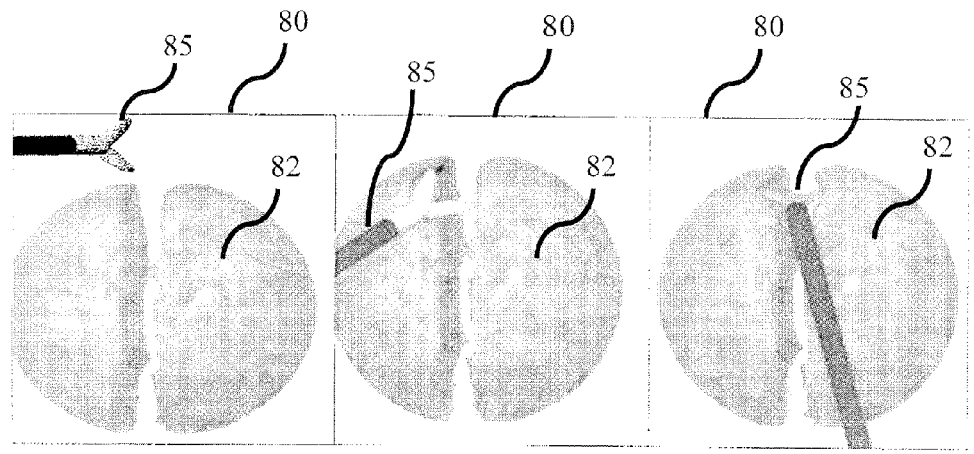
FIGS. 14A, 14B, and 14C are screen images of 3-dimensional visual representations of the working end of a laparoscopic surgical device in one embodiment of the subject invention. Specifically shown is a laparoscopic dissecting device being utilized to manipulate virtual tissues.
Figures 15A, 15B:
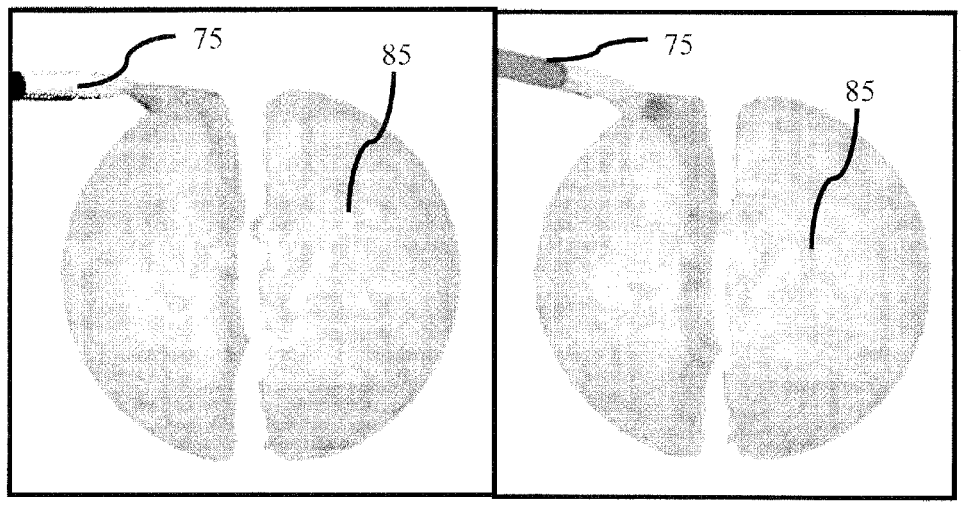
FIGS. 15A and 15B are screen images of 3-dimensional visual representations of the working end of a laparoscopic surgical device in another embodiment of the subject invention. Specifically shown is a laparoscopic grasping device being utilized to manipulate virtual tissue.
Figure 16:
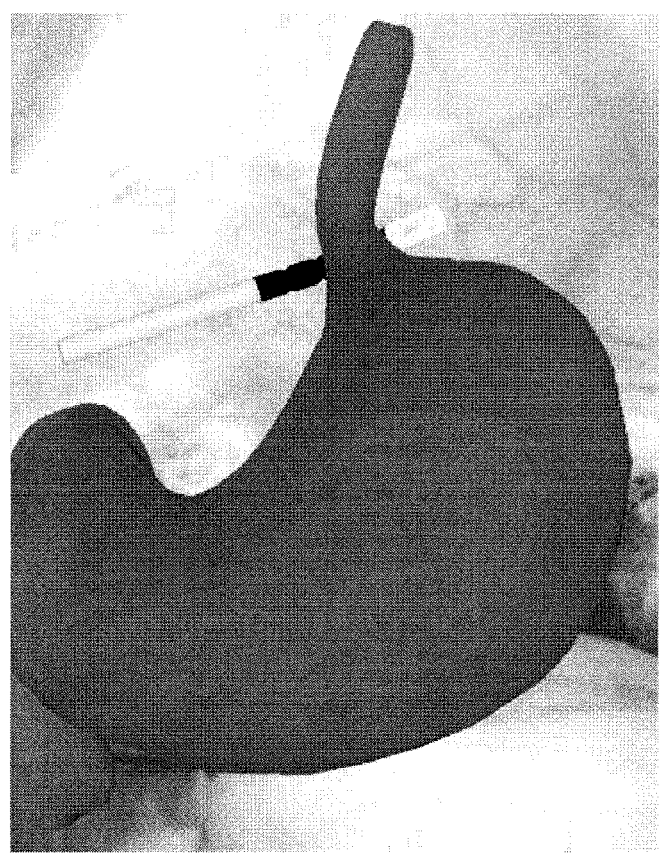
FIG. 16 is a screen image of a virtual environment of the subject invention wherein an embodiment of a virtual working end of a surgical dissection device is interacting with a virtual model of a human stomach.
Figure 17A:
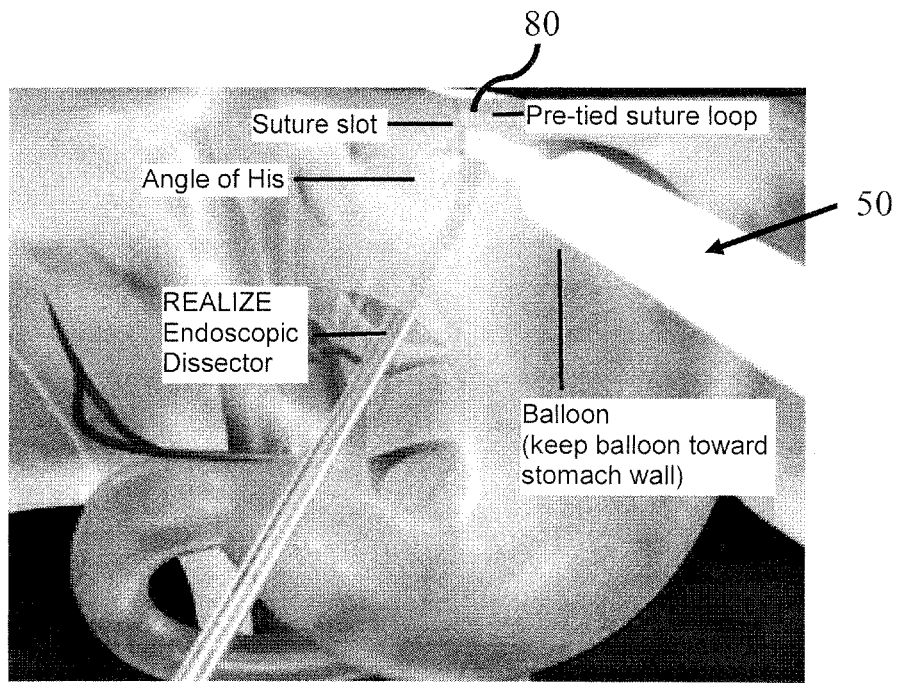
FIGS. 17A and 17B are screen images of a more realistic virtual environment of the subject invention wherein an embodiment of a virtual working end of a dissection device is utilized to install a virtual representation of a gastric band around a virtual representation of a stomach.
Figure 17B:
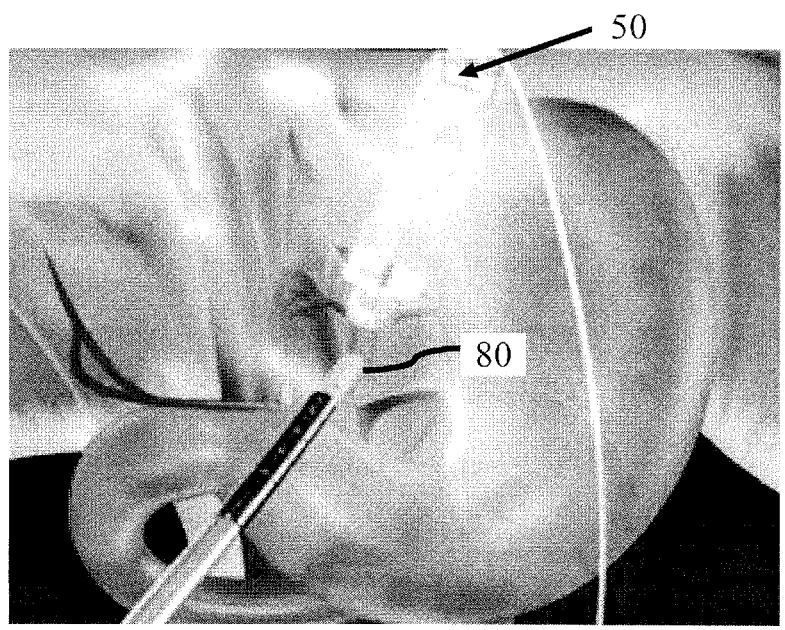

As show in FIGS. 12 and 13, the handle 75 of the pen can be modified to replace the stylus on the ¼" jack 24 of a PHANTOM OMNI® Haptic Device 20. The modified handle 76, including any control mechanisms associated therewith, can translate the turning of the dial 74 to properly position the working end 73 and the lighted tip 72 in progressively more or less curved or bent stages, advancing and retracting, and rotating the device into one or more signals that can be received by the haptic device through the operable connection to the jack 24. The signals can subsequently be transmitted to a display device for interpretation into a visual representation on the display device, such as, for example, a computer monitor.

In an embodiment of the subject invention, the modified handle 76 of the pen 70 comprises any of a variety of switches, pressure sensors, biometric sensors, circuits, and/or other sensing devices known to those with skill in the art, to translate the mechanical manipulations of the pen 70, e.g., turning of the dial 73, into electrical signals. In a further embodiment, a modified dial 78 is operably connected to one or more micro-switches 79, known to those with skill in the art and described previously, that are utilized to translate the mechanical manipulations of the dial into electrical signals. In a still further embodiment, the micro-switches are further operably connected to a jack connector 80, which is known in the art and capable of operable connection to a stereophonic jack, as described previously.

Figure 10:
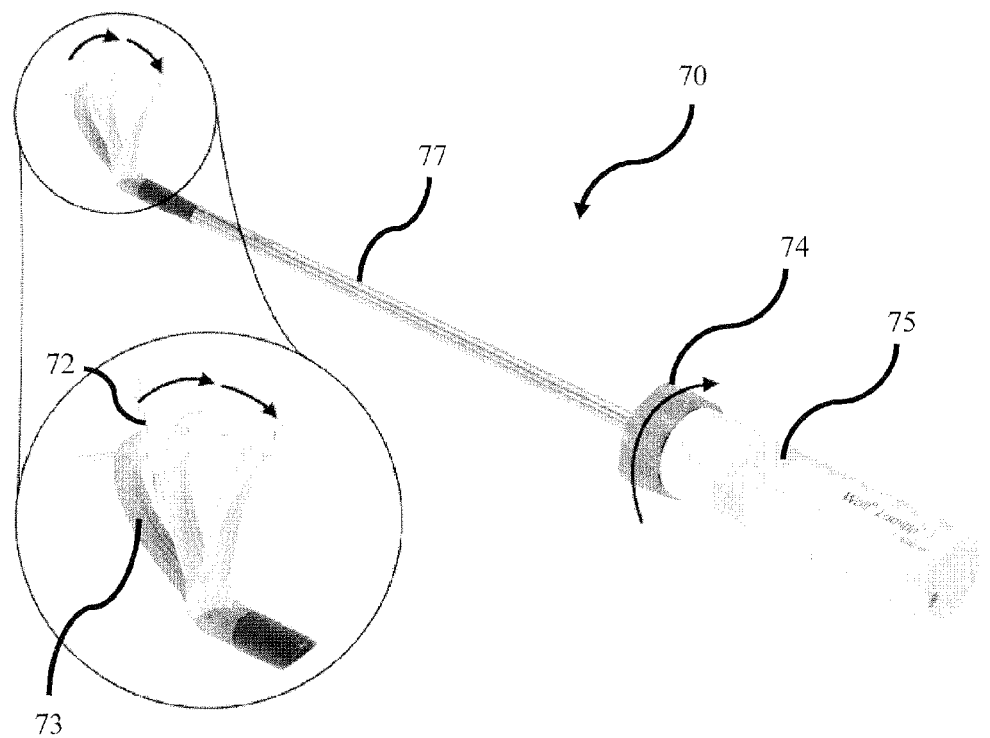
FIG. 10 is a photograph showing the normal operation of a WOLF™ LUMITIP™ Endoscopic Dissector (AtriCure, Inc., West Chester, Ohio), having a lighted tip at the working end that can be bent backwards to dissect around tissues.
Figure 11:
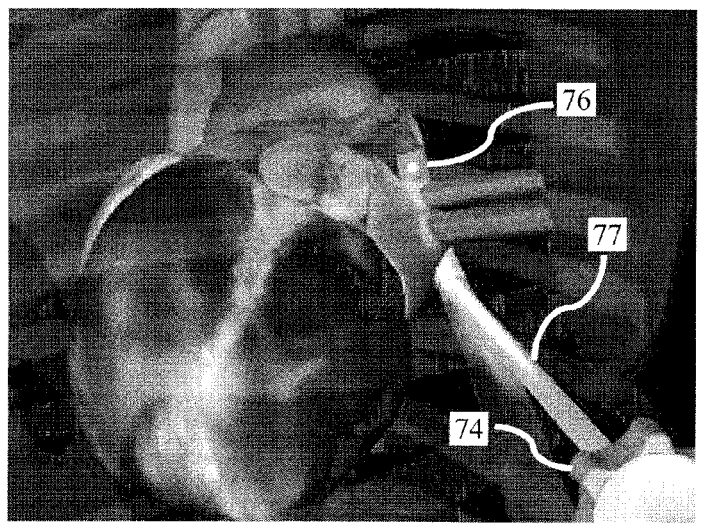
FIG. 11 is a screen image of a virtual representation of the working end of a WOLF™ LUMITIP™ dissector interacting with a virtual representation of a heart within a virtual environment.

During a procedure, the operation of the working end 73 of the pen can be controlled by turning a dial 74 on or near the handle 75 to extend an elongated blade (not seen) within the elongated shaft 77 that causes the working end to gradually rotate towards the shaft to a maximum angle of approximately 100°, as seen in FIG. 10. Turning the dial in the opposite direction will cause the working end to rotate away from the elongated shaft 77. Thus, the position of the working end 73 is controlled by turning the dial 74. To change the position of the device relative to a tissue or organ necessitates physically moving the handle to advance or retract and/or rotate the shaft 77. Thus, the working end of the device can demonstrate up to 6 degrees of rotational freedom, as well as, another degree of positional sensing freedom provided by the position of the working end, either bent or straight. Thus, the device of the subject invention can realize up to 7 degrees of freedom.

Therefore, in a specific embodiment of the subject invention the elongated shaft 77 and the retracting blade contained therein (not shown) that controls the rotation of the working end 73 are removed approximately 1.0" to approximately 4.0" from the handle. The handle can then by modified with one or more sensing devices so that the turning of the dial 74 is translated into one or more signals that can be received by a display device. In one embodiment, the sensing device is at least one microswitch 79 fixedly positioned in or on the handle cover 81 and/or the elongated shaft 77, so that the rotation of the dial activates the one or more microswitches 79, an example of which is shown in FIGS. 12A and 12B. In a specific embodiment, at least one stepped microswitch is operably connected to the dial, whereby turning the dial in either direction triggers the microswitch incrementally, which is interpreted by and displayed on a display device as increased or decreased bending of the working end. In this embodiment, the movement(s) of the dial will trigger the one or more microswitches to translate the motion through a stereo jack connector, which is operably connected to a ¼" stereophonic jack 24 on a haptic device, shown, for example, in FIG. 13. In a still further embodiment, the dial 74 mechanism can also be modified with one or more teeth, as shown in FIG. 12B, to facilitate operation and/or operable connection with the one or more microswitches. In this embodiment, the internal dial cylinder 74A is modified with a plurality of gear-like teeth 74B, as seen, for example, in FIG. 12B, such that as the dial is turned individual teeth operably connect with the microswitch. A connecting cover, as described previously, can also be used to maintain the position of the jack connector with the truncated end of the elongated shaft 77 and secure the modified handle to the haptic feedback device.

In normal operation of the pen 70, the extending blade (not seen) is controlled by turning the dial 74, which extends the blade within the shaft 77 towards the working end 73. As the extending blade is advanced within the shaft 77, the working end is forced to bend. These motions can be sensed and translated into one or more signals by the modified handle of the device utilizing one or more microswitches 79, known to those with skill in the art. Thus, in one embodiment, at least one microswitch 79 is operably connected to the dial 74, which translates the motion of turning the dial into a signal that can be transferred through the jack connection on PHANTOM OMNI® haptic device and subsequently to a display device. The display device presents a virtual model of the working end 73 and interpret the microswitch signals so as to modify the virtual model accordingly. In a further embodiment, the display device can transmit appropriate haptic responses to the PHANTOM OMNI® device. Thus, a surgeon manipulating the handle and interacting with a virtual tissue or object can receive tactile sensations from the PHANTOM OMNI® device that mimic the interactions and sensations that would occur when manipulating the device with actual or real tissues or objects.

As discussed above, the transmission of the one or more microswitch signals from the modified pen handle to the PHANTOM OMNI® haptic device 20 can be accomplished by a variety of methods and devices known to those with skill in the art.

II. Modeling Virtual Environments

Figure 20:
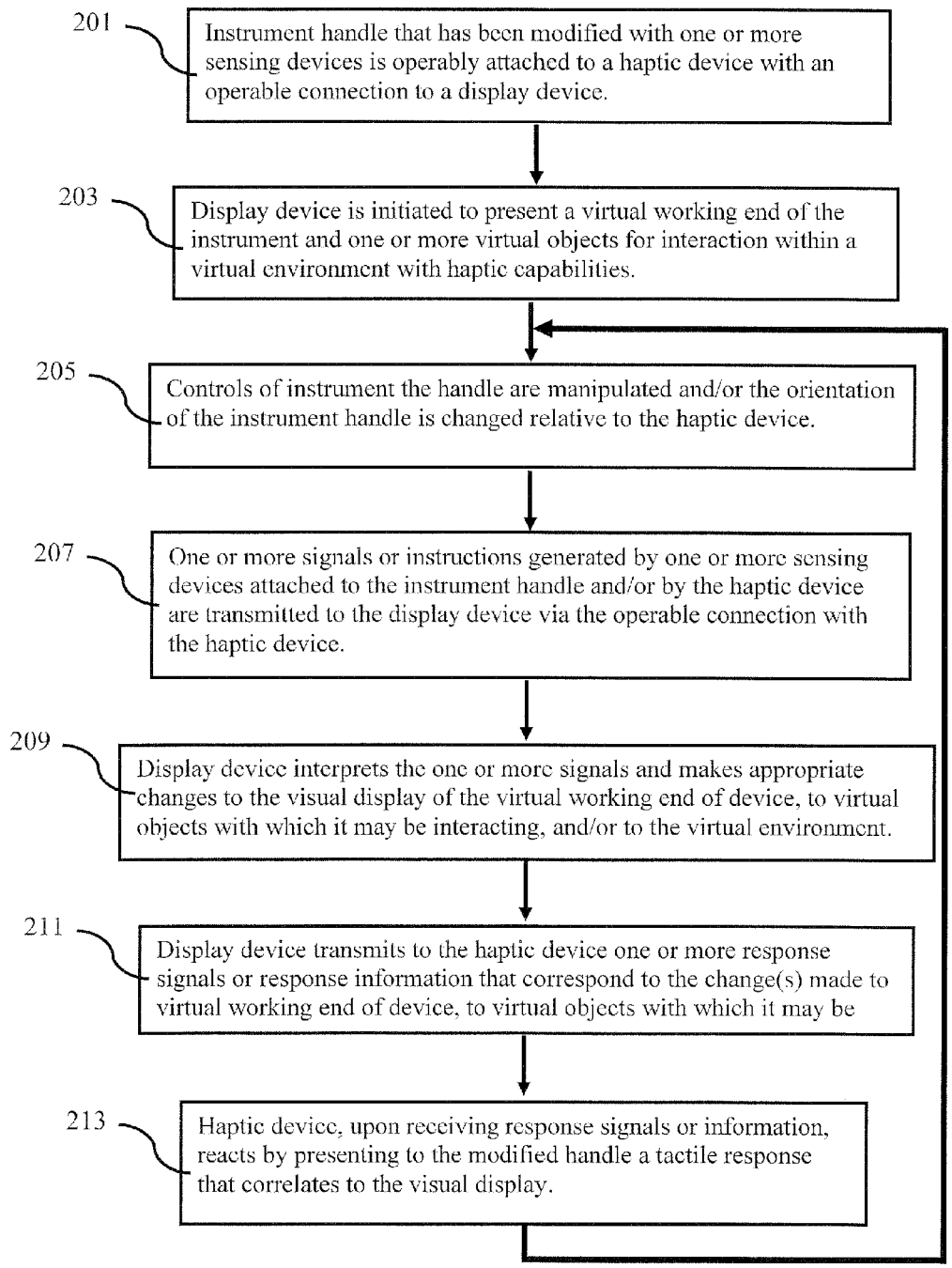
FIG. 20 is a flowchart of one embodiment of a system or implementing the subject invention.

During most minimally invasive procedures, a surgeon will utilize an endoscope, or laparoscopic camera, to see the in vivo working end of the device and surrounding intracorporeal environment within the laparoscopic field of vision. Therefore, to accurately simulate a surgical environment for training, the surgeon must be presented with an accurately simulated version of the working end of an instrument or device as it would be normally seen and controlled by manipulating the instrument handle. In a particular embodiment, illustrated in FIG. 20, the working end of one or more instruments and/or other intracorporeal objects are seen as virtual objects within a virtual environment or scene. As described in the above embodiments and examples, the manipulations of a modified handle device can be converted into at least one signal that can be transmitted to a display device capable of interpreting the signal(s). The display device can interpret the signal(s) from the modified surgical instrument handle and present a visual representation as a virtual object of the manual manipulations that caused such signal(s). In a particular embodiment, the display device presents 2-dimensional (2D) and/or 3-dimensional (3-D) virtual images, of the various virtual objects with in the scene. FIGS. 11 and 14A-17B illustrate examples of virtual tissues or organs being manipulated with a 3-D image of the working end of a virtual surgical device.

As seen in FIGS. 11 and 14A-17B a virtual environment 80 or portions thereof can be presented visually. Within the virtual environment there are any of a variety of virtual objects 82, including the working ends of a surgical instrument 85, tissue 82, and other apparatus, e.g., the gastric band 50 shown in FIGS. 17A and 17B. As signals generated by a modified instrument handle, described in detail above, are transmitted to the display device, the virtual objects 82 and virtual working end 85 and virtual environment 80 can be altered to present one or more images that correspond to the manipulations of the modified instrument handle. In a specific embodiment, the image display is altered in "real-time" such that the actions of the modified instrument handle and the effects of such action are immediately, or almost immediately, displayed within the virtual environment.

A person with skill in the art having benefit of the subject disclosure would know how to utilize such techniques to model a "virtual environment" in which a surgeon can see a 2-D or 3-D image that simulates a real environment or image display 80, including virtual objects 82 therein and/or a device's working end 85. Further, such a skilled artisan would be able to utilize techniques allowing the manipulations of a modified instrument handle to cause an immediate ("real-time") or almost immediate effect on the virtual objects 82 and/or virtual working end 85. A number of state-of-the-art technologies including: advanced graphics programs (novel surface representations, real time recording of hand motion in virtual scene, etc.) can be used to virtually simulate objects.

In one embodiment of the subject invention, a 3-D virtual environment or scene is created or modeled that simulates, for example, an intracorporeal or in vivo environment that a surgeon is likely to encounter, and one or more images of an instrument working end 85 are stored and imported into a 3-D virtual scene. FIGS. 11, 14A-C, 15A-B, 16, and 17A-B illustrate examples of displays of virtual simulations of organs or tissues and/or imported 3-D virtual environments with which one or more simulated or virtual working ends 85 can interact within the virtual environment.

Figure 19:
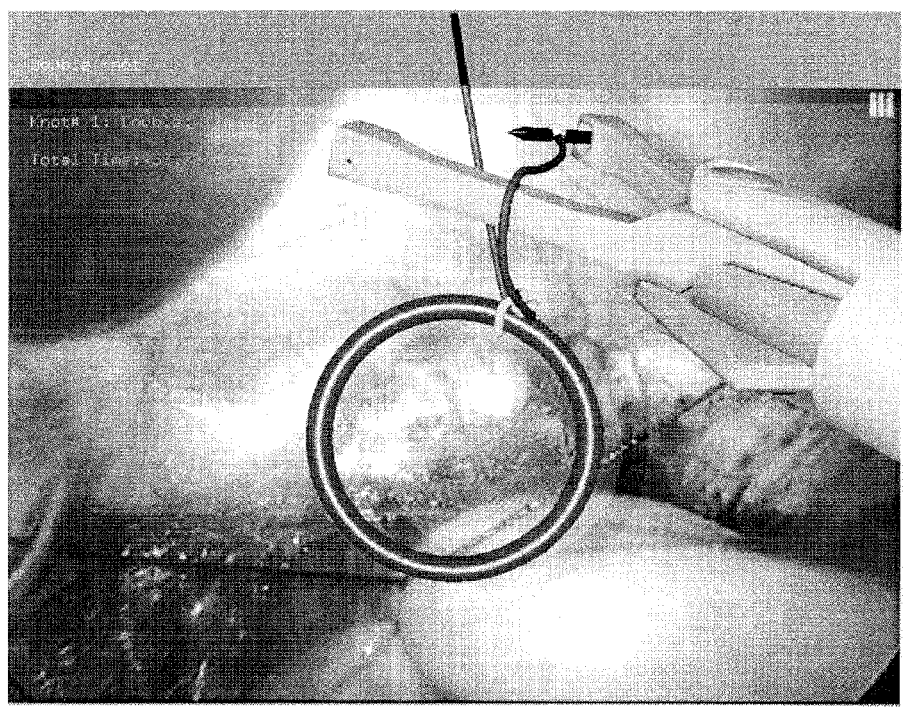
FIG. 19 is a screen image showing the virtual working end of the device described in FIG. 18 being manipulated through a knot tying training exercise within a virtual environment.

In one embodiment, a static background image is used to add realism to the simulation. For example, an in vivo image of the human body can be used as shown in FIG. 19. Such an image can be captured from an endoscope or laparoscopic camera. An image from an actual procedure being practiced can be used. Or, if a particular surgical instrument is being practiced, an in vivo image can be used of a location in the human body where that particular surgical instrument is often utilized.

As known in the art, various virtual objects can be modeled as collections of one or more geometric shapes or polygons. In a specific embodiment, 3-D models of a surgical instrument working end 85 in different configurations can be recreated using the Autodesk® 3ds Max® 8 software package. Once created, various images of the working end configurations, for example the open and closed jaws of an Endo device, described above, can then be imported and stored for use in a virtual scene.

Figure 22:
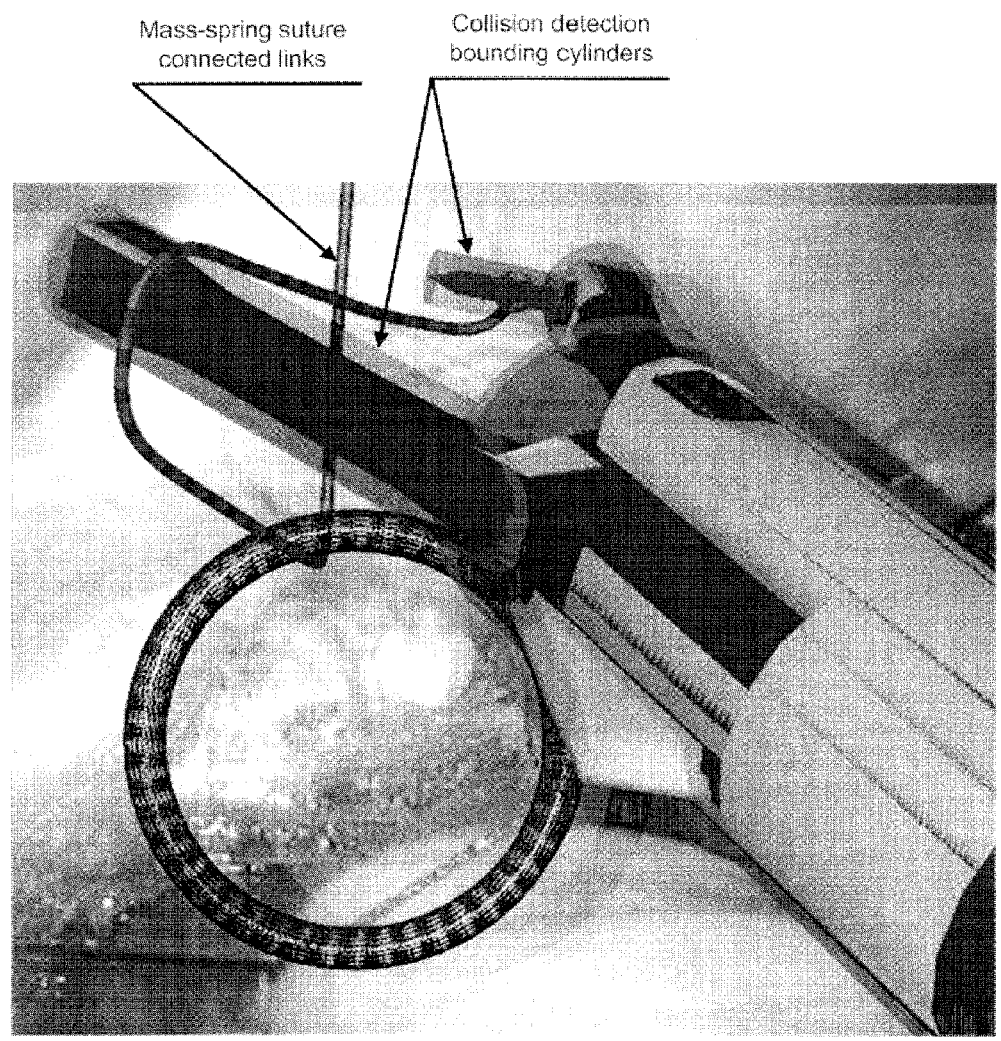
FIG. 22 is a screen image showing the bounding volumes for collision detection that surround the components of a virtual working end of a device. Also illustrated is a virtual suture created using mass-spring connected links that is being manipulated by the virtual working end. Contact between the virtual suture and the bounding shapes surrounding the working end of the device cause the suture to react in a realistic fashion.

Simple objects, such as, for example, the exercise ring depicted in FIG. 19, can consist of just one shape. More complex objects, such as the working end of the ENDO STITCH™ device, also depicted in FIG. 19, can be made up of any number of different geometric shapes. As known in the art, various graphics libraries can then be used to render and display these shapes on a monitor or other display device. For example, application programming interfaces (API) can be utilized with the subject invention such as, for example, OpenGL and Direct3D (a substituent of Microsoft DirectX) two of the most common graphics API's. Still more complicated objects can be modeled and rendered. For example, the surgical thread or suture depicted in FIG. 22 is made up of many small, connected cylinders. Each cylinder is linked to those on either side in a chain-like or similarly connected fashion. The behavior of the entire suture is then modeled according to a mass-spring model as is well known in the art. For example, an embodiment of a mass-spring model that could be utilized with the subject invention is disclosed by A. Nealen, M. Müller, R. Keiser, E. Boxermann, M. Carlson, Physically Based Deformable Models in Computer Graphics (State of the Art Report), Proceedings of Eurographics 2005, pp. 71-94 (Eurographics 2005, Dublin, Ireland, Aug. 29-Sep. 3, 2005), which is hereby incorporated by reference herein in its entirety. Alternatively, there are other techniques and methods known in the art that can be utilized to model and render a virtual suture such as, for example, a geometric curve technique, such as, for example, the method disclosed by A. Theetten, L. Grisoni, C. Andriot, and B. Barsky, "Geometrically exact dynamic splines," INRIA, Tech. Rep., 2007, which is hereby incorporated by reference herein in its entirety, or the method utilizing geometric constraints disclosed by J. Brown, J.-C. Latombe, and K. Montgomery, "Real-time knot tying simulation," The Visual Computer, vol. 20, no. 2-3, pp. 165-179, 2004, which is also hereby incorporated by reference herein in its entirety; and other techniques based upon continuum mechanics, such as, for example, Cosserat Rods as disclosed by J. Spillmann, M. Teschner, Cosserat Nets, to appear in IEEE Transactions on Visualization and Computer Graphics, also hereby incorporated by reference herein in its entirety. These techniques are meant to be exemplary only. Other techniques known in the art can also be used with the subject invention and such variations are contemplated to be within the scope of the subject invention.

In a further embodiment, human or other animal tissue, as shown in FIGS. 11, 14A-C, 15A-B, 16, and 17A-B, can also be modeled using various techniques known in the art. For example, the mass-spring model discussed above can be embedded in a 3D regular grid to model the dynamic response of the tissue. Visualization of the tissue can be accomplished through a modified marching cubes algorithm, which allows visualizing cut surfaces of tissue, such as fatty tissue. A cut is modeled as removal of connections in the mass-spring model. The modified marching cubes algorithm recognizes the missing connections and models the tissue response accordingly. This technique is disclosed by S. Punak, "Geometrically and physically based modeling for deformable objects simulating soft tissue interactions in surgery environments," Ph.D. dissertation, 1997, University of Florida, which is hereby incorporated by reference herein in its entirety.

An alternative embodiment can utilize mesh based methods for tissue modeling, such as, for example, the Finite Element Method (FEM) and mesh free methods such as Smoothed Particle Hydrodynamics (SPH), as disclosed by A. Nealen, M. Müller, R. Keiser, E. Boxermann, M. Carlson, "Physically Based Deformable Models in Computer Graphics (State of the Art Report)," Proceedings of Eurographics 2005, pp. 71-94 (Eurographics 2005, Dublin, Ireland, Aug. 29-Sep. 3, 2005) (supra). These techniques are meant to be exemplary only. A person with skill in the art and benefit of the subject disclosure would be able to utilize other techniques known in the art to achieve the objectives of the subject invention. Such alternatives are contemplated to be within the scope of the subject invention.

FIGS. 14A-C and 15A-B illustrate examples of virtual environments wherein various images of the working ends 85 of surgical devices have been created that correspond to the actions and manipulations of the modified instrument handle. In one embodiment, information from sensors on the modified instrument handle determines the configuration of the 3-D virtual jaws of an Endo device. For example, the jaws can be rendered in an open or "neutral" position (for example, FIGS. 14A-C) or closed position (FIGS. 15A-B) depending on input from one or more sensors. In another embodiment, the sensors are incorporated into a modified handle of a surgical instrument as shown in FIGS. 4, 5, 9, and 12. A further example is provided in FIG. 16. In this example, information received from sensors incorporated in the modified instrument handle determine the appropriate configuration of the working end of a tissue dissector. In a still further embodiment, shown in FIG. 11, sensors incorporated in the modified instrument handle of a dissector pen can determine whether the tip of the dissector pen 76 is rendered as bent or straight. As discussed above, there are various methods available for communicating control signals which contain information with regard to the controls of a particular surgical instrument. The examples given here are merely exemplary and are not meant to limit the claimed invention.

In one embodiment, shown, for example, in FIG. 1, the manipulations of the modified instrument handle are transmitted to a computer by utilizing a haptic device. In a specific embodiment, the PHANTOM OMNI® haptic device is utilized with an operably connected modified instrument handle to transmit one or more signals to the computer. In a further embodiment, the display device transmits response signals or response information to the haptic device that correlate to the interactions and changes within the virtual environment and/or changes to the visual display brought about by the virtual working end. By way of a specific example, an instrument handle, as described above, operably connected to a haptic device can be used to transmit signals or instructions to a computer that correspond to the operation of the virtual working end. The virtual working end can be utilized to interact with other virtual objects, such as, for example, virtual tissues, organs, or devices, within the virtual environment. As illustrated by the example in FIG. 1, response information or response signals that correspond to the effects of the changes to the virtual environment interactions can be transmitted back to the haptic device. The haptic device can respond by presenting to the handle appropriate and corresponding tactile responses. Thus, a trainee using the handle would receive tactile feedback similar or identical to the tactile feedback of an actual surgical technique or procedure.

To accurately simulate a surgical technique or procedure, it can be helpful for the tactile feedback to be transmitted to the instrument handle in "real-time." To facilitate such real-time feedback, an appropriately configured display device can be utilized with the subject invention. In a specific embodiment, the display device is an Intel® Core™ 2 Duo with 2 GB of RAM computer equipped nVidia GeForce 8800 series video card. However, it should be understood, that a person with skill in the art would be able to devise any of a variety of hardware devices and combinations thereof suitable for use with the subject invention. In preferred embodiments, the display device will have adequate memory, speed, and display capabilities to accurately simulate a virtual environment and an instrument working end, and be capable of providing appropriate real-time haptic and visual feedback to accurately simulate a surgical procedure as it would be performed with the surgical devices disclosed herein, or other surgical instrument utilized with the subject invention.

In a further embodiment, the computer program of the subject invention is based on open source OpenGL graphic libraries, standard C++ programming language, and includes libraries from the OpenHaptics™ toolkit (SensAble Technologies, Inc.) and wxWidgets, an API for writing graphical using interface (GUI) applications on multiple platforms. These products were developed to support the real time manipulations of the surgical device, which can accompany the modeled instrument in the virtual environment.

Figure 21:
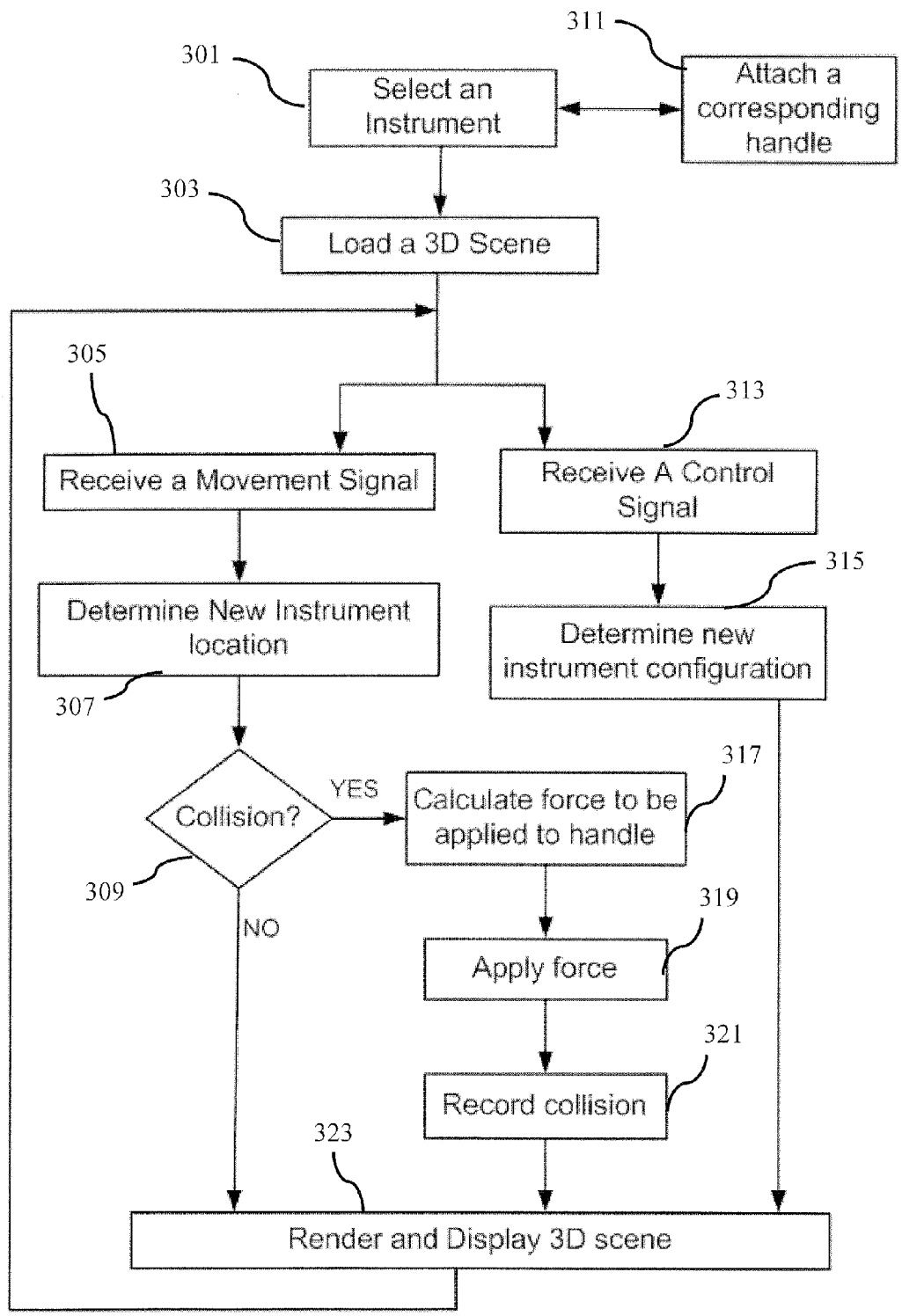
FIG. 21 is a more detailed flowchart showing the 3D modeling of one embodiment of the subject invention.

FIG. 21 discloses a flow chart depicting one embodiment of the subject invention. Intermediate and additional steps can be employed in various embodiments of the invention and not all of the steps presented in this figure may be required. In the embodiment presented, at step 201 a modified instrument handle is selected and attached to a haptic device. Various methods are available for connecting such a handle to a haptic device as discussed above. The haptic device is also connected to a display device or computer as discussed above. At step 203, the display device is initialized. This step can involve loading information from Storage, as depicted in FIG. 1, including the shape and mass of various virtual objects that will make of the virtual scene. At as step 205, operation of the system has begun. In this step, controls on the instrument handle are manipulated and the handle itself can be used. As discussed above, the haptic device can be configured to discern changes in both position and orientation of the instrument handle and sensors incorporated in the handle can communicate additional information with regard to the status of various instrument controls. At step 207, this information is communicated to the display device. As discussed above, this communication can take various forms well known in the art.

At step 209, the various input signals are interpreted by the display device. At this step, information from the haptic device can be used to update the position of the virtual surgical instrument within the virtual scene. As discussed in relation to FIG. 1, the virtual scene can be stored in the computer's memory and updated as input is received. In a further embodiment, information from the controls can be interpreted by the computer by means of an interface to the controls also stored in the computer's memory. For example, the computer can decode information received from various sensors according to a control's interface in order to discern the appropriate configuration of the working end of the virtual surgical instrument that results from the operation of the control. The display device updates the virtual scene based on this information and outputs an updated display of the scene. For example, the scene can be rendered with computer graphics and displayed on a computer monitor or other device.

As shown at step 211, in a further embodiment of the subject invention, the display device can also send an output signal back to the haptic device as a result of the updated scene. For example, if the virtual surgical instrument has collided with another virtual object, the display device can transmit a signal back to the haptic device directing it to provide an appropriate tactile response at step 213 to the modified instrument handle. In one embodiment, the tactile response comprises a force or resistance that corresponds to the force generated by the collision. Simplified or more complex mechanics formulas well known in the art can be used to calculate or approximate the force generated from a collision. In a further embodiment, the mass of the virtual objects is stored and used to more accurately calculate the force resulting from a collision.

The operation of the simulation can continue when additional input is received based on further manipulation of the handle and controls at step 205. The system can then again proceed to process the resulting signals through steps 207-213 as described above.

FIG. 21 shows a more detailed flow chart of a computer program embodiment of the subject invention. As discussed above, such a computer program can be embodied in various media and executed by any number of computers and electronic devices. Intermediate and additional steps can be employed in various embodiments of the invention and not all of the steps presented in this figure may be required.

At step 301, an instrument to be simulated is selected. The instrument can be a surgical instrument such as a laparoscopic instrument or another type of instrument such as an instrument for tying knots. The instruments discussed above are exemplary and are not meant to be limiting in any way. The instrument can be selected by user input in a graphical or other computer interface, such as typing the name of an instrument or selecting it from a drop down menu. Various selection methods are well known in the art. The selected instrument can also be identified when a handle is attached at step 311. As is well known to those in the art, when operably connected to a computer, a peripheral device is can transmit various initializing information to the computer including identifying information. Thus, in the instrument to be simulated can be selected merely by plugging the desired instrument in to a peripheral port.

At step 303, further initialization occurs including loading into memory various information about the 3D scene to be depicted. Such information will include information about the surgical instrument to be simulated. Information about the shape of the instrument is loaded and later used to render the instrument as discussed above. An interface to the controls of the simulated instrument, as discussed above, is also be loaded at this time. In a further embodiment of the subject invention, information related to the mass of the selected instrument is also be loaded at this time. In a further embodiment of the invention, bounding volumes associated with the instrument are loaded at this time. The use of such bounding volumes is well known in the art and further discussed below.

Information about any other virtual objects in the virtual scene to be depicted is also loaded at this time. As discussed above, such other objects can include human or other animal tissue, other instruments, surgical thread, and exercise rings or any other apparatus which can facilitate training or assessment of the use of the simulated instrument. Various information can be stored with respect to such other objects including but not limited to information regarding their shape, mass, controls, and bounding volumes.

The 3D scene is then rendered based on the information provided and can be displayed on an output device such as a computer monitor, holographic projection, or other device capable of visualizing 3D images. Initialization is thereby completed, and, as is well known in the art, the method then enters an event loop in which it waits for further input signals before proceeding. Various techniques are well known in the art for implementing such an event loop and the subject invention is not limited by the chosen technique.

The process continues when either a movement or a control signal is received at a step 305 or 313. Proceeding with step 305, a movement signal can be received indicating movement of the simulated instrument. As discussed above, in a preferred embodiment of the invention the signal is received from a haptic device although other input devices can be used. The movement signal can be presented in various formats. For example, a velocity of movement of the simulated instrument can be indicated by speed and direction. In another embodiment of the invention, a new position is provided. Along with the previous position and the elapsed time, a velocity can then be calculated for the simulated instrument. In a further embodiment of the invention, an orientation of the simulated instrument is also provided which can indicate the angle and rotational orientation of the instrument.

At step 307, the movement information is used to determine a new location for the simulated instrument within the virtual scene. Next at step 309, the method checks for collisions between the simulated instrument and the other objects in the virtual scene. If no collisions are detected, the method proceeds to step 323 where the updated scene is rendered which includes the new location of the simulated instrument. The method then returns to the event loop and continues at step 305 or 313 when a new movement or control signal is received.

If a collision is detected, the method first proceeds to step 317. At this step, as discussed above, mechanics formulas are employed to calculate or approximate the effect of the collision which can include yet another new location for the simulated instrument and other objects in the scene. In this embodiment, the result of such calculation includes a force to be applied to the handle of the simulated device to simulate the tactile sensation of the collision. At a step 319, the force information is transmitted to an output device such as a haptics device which can then output the force to the user via an attached handle or other device. At a step 321, information about the collision is recorded in the computer's memory. Such information can include the time of the collision, the identity of the objects which collided, among other information. Such information can later be used to assess the operation of the simulated instrument as discussed further below. The method then proceeds to step 323 where the updated scene is rendered including the new location of the simulated instrument. The updated scene can also include new locations for the other objects in the scene, such as the object which was collided, the struck object. The method then returns to the event loop and continues at step 305 or 313 when a new movement or control signal is received.

Returning to step 313, if a control signal is received, it indicates manipulation of one or more of the controls on the simulated instrument. As discussed above, the simulated instrument can have various controls which change its configuration. Operation of such controls can be sensed by various techniques discussed above or otherwise known in the art. At step 315, the method determines the effect of the control signal according to the interface information previously loaded at step 303. As discussed above, various signals can indicate various changes in configuration such as bending of the instrument tip or opening or closing of the instruments jaws. The method next proceeds to step 323 where the updated scene is rendered which includes the new configuration of the simulated instrument. The method then returns to the event loop and continues at step 305 or 313 when a new movement or control signal is received.

As discussed in relation to FIG. 21 and other embodiments, collision detection can be implemented using various techniques well known in the art. For example, the use of "bounding volumes" is known to those with skill in the art of computer graphics as a method of collision detection within virtual environments. With this technique, all of the points that define the shape of a virtual object are defined within one or more bounding volume shapes, such as, for example, a sphere, cylinder, ellipsoid, capsule, box, or other convex shape capable of containing all the points and the axes there between of a virtual object. FIG. 22 depicts an example of bounding volumes, in this case cylinders, used to approximate the shape of a virtual working end of a simulated instrument. Collision detection between virtual objects is usually determined by whether the various axes of two or more bounding objects intersect.

In one embodiment of the subject invention, one or more components of a virtual surgical device are approximated within one or more bounding volumes. In one embodiment, the movable or working components are defined within one or more bounding volumes. In an alternative embodiment, the entire working end of a surgical device is defined within one or more appropriate bounding spheres. This allows for a greater variety of interactions between the virtual device and virtual objects, lending more realism to the simulation. Detection algorithms can then be utilized to calculate appropriate interactions and reactions between the virtual surgical device and other virtual objects. A person with skill in the art would be able to determine any of a variety of appropriate methods and techniques for defining bounding spheres and collision detection algorithms therefore. Such modifications as would be apparent to such a skilled person having benefit of the subject disclosure are contemplated to be within the scope of the subject invention.

III. Training and Assessment Tools

Before a surgeon utilizes a device or skill during a medical procedure, it is important to know whether sufficient proficiency has been obtained to perform that procedure safely and accurately. The subject invention includes a training platform that teaches the necessary skills and operations of medical devices and also assesses acquired proficiency with that device.

In one embodiment, the display device and associated programming provide step-by-step instructions or "coaching" to a trainee while conducting a virtual procedure. In this embodiment, a "virtual coach" is able to explain by either written or audio instructions to the trainee each successive step required to complete a particular procedure with an instrument. In one embodiment, the virtual coach provides written instructions on the display device that can be read and followed by the trainee. In an alternative embodiment, the virtual coach provides a combination of written and audio instructions that can be followed by the trainee. The audio instructions can be delivered by means of an output device such as an audio speaker. The use of a virtual coach can enhance performance and reduce the amount of time necessary to learn a procedure or use of a particular instrument. See, for example, Kurenov, S., Punak, S., Peters, J., Lee, C., Cendan, J., "Development and Initial Validation of a Virtual Reality Haptically Augmented Surgical Knot-Tying Trainer for Autosuture™ ENDO STITCH™ Instrument." Medicine Meets Virtual Reality (MMVR17), Jan. 19-22, 2009, Long Beach, Calif.; Studies in Health Technology and Informatics, Volume 142, Pages 145-147. doi: 10.3233/978-1-58603-964-6-145.

In one embodiment, the virtual coach utilizes specific algorithms that recognize different steps being performed during a procedure. In a specific embodiment, the Dowker notation is utilized to recognize different steps during the procedures of tying different types of knots. The Dowker notation (also known to as the Dowker-Thistlethwaite notation) is a method used to describe a projection of a knot. With this method each crossing of the line is labeled with a positive and negative number that when added derive a unique number permutation for each type of knot. From this information, various key steps in the tying of the knot can be identified. The completed knot can also be identified. The utilization of this procedure is known in the art and is discussed, for example, by J. Brown, J.-C. Latombe, and K. Montgomery, "Real-time knot tying simulation," The Visual Computer, vol. 20, no. 2-3, pp. 165-179, 2004 and by C. Adams, *The Knot Book: An Elementary Introduction to the Mathematical Theory of Knots*, Williams College, Williamstown, Mass., 2004, both of which are incorporated by reference herein in their entirety. The Dowker notation can be implemented with the virtual suture or surgical thread of the subject invention to identify knots and steps in knots tied using the suture. An example of a knot-tying instrument and suture simulated within a virtual environment is disclosed in PCT/US2007/083550, which is hereby incorporated by reference in its entirety, including all tables, figures, and references.

Figure 23:
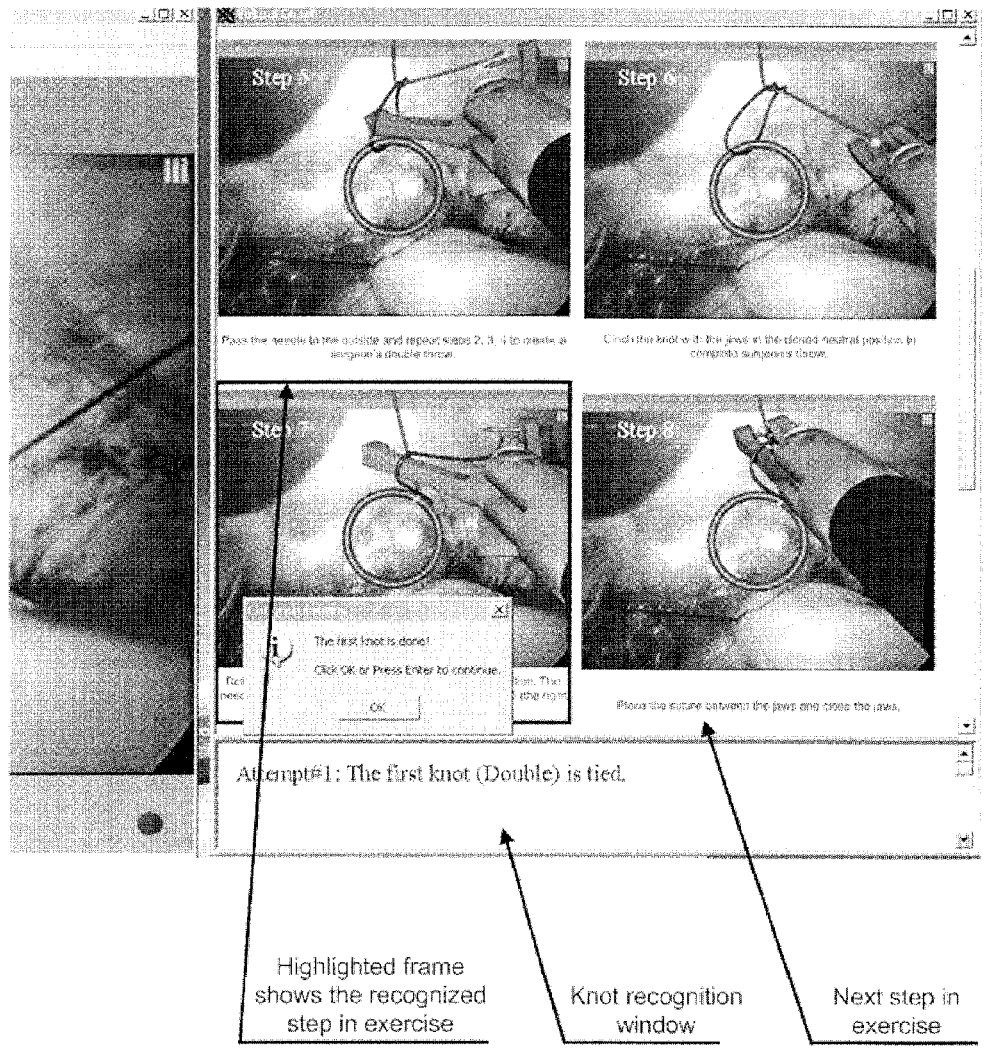
FIG. 23 is a screen image of an embodiment of the subject invention illustrating some of the training and assessment tools. In this embodiment, a display device can "coach" a trainee through each step of the knot-tying process. The Dowker Notation utilized by the supporting computer program is capable of recognizing different knot structures and determining which step is being performed and when the knot is completed and tied correctly. This information can then be presented to the user via a display screen or other output device, such as an audio speaker.

As an illustrative example, a specific embodiment utilizing the Dowker notation along with a virtual coach is depicted in FIG. 23. In this example, a knot is tied with a knot tying instrument around a fixed exercise ring, but further embodiments are contemplated in which knots are tied on virtual representations of human or other animal tissue. In this embodiment, the user first selects a knot to be tied using a drop down menu or other input method known in the art (not shown). A step-wise procedure for tying the selected knot is then loaded from Storage, as shown in FIG. 1. The steps of the procedure can then be visually displayed to the user. The steps, with both text and images, can be displayed along side the graphical representation of a virtual scene. Static or video images of actual procedures can be employed to show the steps, but it can be more helpful for the user to display static images or animations which more closely match the graphical representation of the virtual scene.

As the user proceeds to tie the knot using the simulated instrument, various steps of the knot are identified using the Dowker notation. These steps can then be highlighted on the screen by a different colored border, as shown in FIG. 23, or other method. It is important to note that Dowker may not identify all intermediate steps in the knot-tying procedure. Thus steps may be skipped by the highlighting border. In a further embodiment, audio voice instructions pertaining to the next step are played after a current step is identified. In alternate embodiment, the next step becomes visible on screen once the current step is identified. Finally, the final step corresponding to the completed knot can be identified. In FIG. 23, this information is presented to the user by way of a pop-up window and a static knot recognition window. Various other methods for presenting such information will be apparent to those skilled in the art of graphical user interfaces and can be utilized with the subject invention.

Depending upon the type of procedure, there can be any of a variety of algorithms that can be utilized by the virtual coach to assist with training in a particular procedure. A person with skill in the art would be able to determine an appropriate algorithm to use for the particular training exercise being taught by the virtual coach. Such variations are contemplated to be within the scope of the subject invention.

In one embodiment, the virtual coach can provide a performance assessment of each training session. This performance assessment can assist the trainee and/or other evaluators in determining when sufficient proficiency has been obtained with a particular procedure or instrument. To evaluate a trainee's performance requires analysis of certain metrics that correlate to the trainee's performance when conducting a virtual procedure. As mentioned above, the subject invention utilizes algorithms, such as, for example, the Dowker notation, to identify specific steps, or stages during a procedure. As the procedure is performed, the virtual coach analyzes various aspects of the virtual scene, as required by the specific algorithm utilized, to determine the progress of the procedure. Recognizing where, in the procedure, the trainee has progressed to, the virtual coach can then provides any of a variety of sounds and/or visual feedback that guides or informs the trainee.

Time is another important metric which can be utilized in various ways to assess the level of proficiency of a user. As discussed above, the time to perform a particular procedure is often limited by the nature of the procedure or by external constraints such as the scarcity of operating facilities. In embodiments of the subject invention, various time values are marked and recorded in memory, as shown in FIG. 1, as a training session progresses. For example, the start time and completion time for a knot tying procedure can be recorded and the amount of time to tie the knot calculated. Or the amount of time spent on a certain critical step of a procedure can be calculated in this way. Or the total amount of time taken to complete the entire procedure can be calculated. These examples are given for illustrative purposes only. Various other uses of time are contemplated and can be used to assess the user's proficiency at various simulated tasks.

Figure 24:
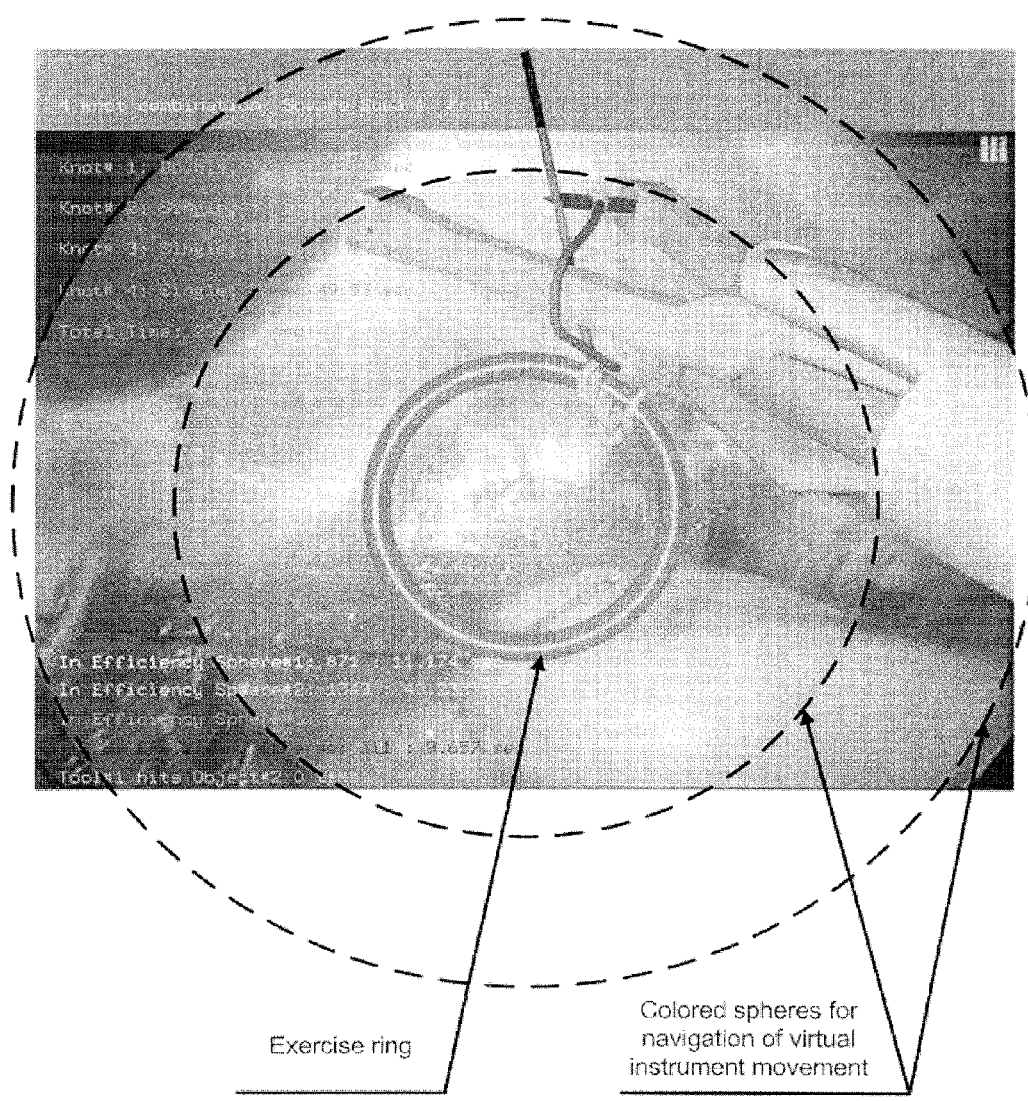
FIG. 24 is a screen image of one embodiment of the subject invention illustrating further training and assessment tools. In this embodiment, an image similar to that shown in FIG. 19 is overlaid with colored "efficiency" spheres that delineate specific areas wherein operation of the working end is monitored by a computer program embodiment of the subject invention. Also in this embodiment, metrics pertaining to the speed and efficiency of the trainee during a session are shown on screen.

FIG. 24 depicts an assessment screen which can overlay a graphical display of the virtual scene, as shown, or otherwise provide information on the progression of the training exercise. This embodiment comprises a knot-tying exercise in which a knot is tied with a virtual suture around an exercise ring. As shown in the upper right hand corner, as each knot is completed, text is output identifying the knot tied and the amount of time taken to tie the knot. In the upper right hand corner of the display, a running counter of the amount of time spent in the training exercise is displayed. This information can be output in various other formats. For example, a table such as that shown in FIG. 25 can be used or audio output can be used. These examples are given for illustrative purposes only. Various other formats are contemplated and can be used with the subject invention.

When performing endoscopic procedures, there is usually a limited amount of space in which to maneuver the various instruments. To avoid damage to surrounding organs and tissues, it is usually important to avoid extraneous movements during procedures in the intracorporeal environment. Thus, when learning a new procedure or use of a new instrument, it can be important to learn how to maneuver within a confined space. In a further embodiment of the subject invention, efficiency areas are implemented to track the efficiency of motion used by a trainee or other operator. These areas can be implemented as virtual objects in the virtual scene and can take on any shape or size contemplated. Those skilled in the art of the surgical procedure being assessed will be able to determine the optimum shape and size of the efficiency areas. The areas can be presented to the user as colored, transparent shapes which overlay the scene. Or they can have no appearance at all.

FIG. 24 depicts a specific embodiment of this aspect of the invention. In this embodiment, the efficiency areas are defined by concentric, colored spheres around the exercise ring. As the training exercise progresses, the computer notes and records each time a working portion or end of the knot-tying instrument enters or exists one of the efficiency spheres. The computer then calculates a running total of the amount of time spent in each area. In this example, the running totals for the three efficiency spheres are displayed in the bottom left hand corner of the screen. Other output formats can be used, such as playing an audio tone every time the working portion leaves an efficiency area. The working portion or end can be defined as a critical point on the simulated instrument or an entire portion of said instrument. Those skilled in the art of the surgical procedure being assessed will be able to determine the optimum shape and size of the working portion.

Figure 25:
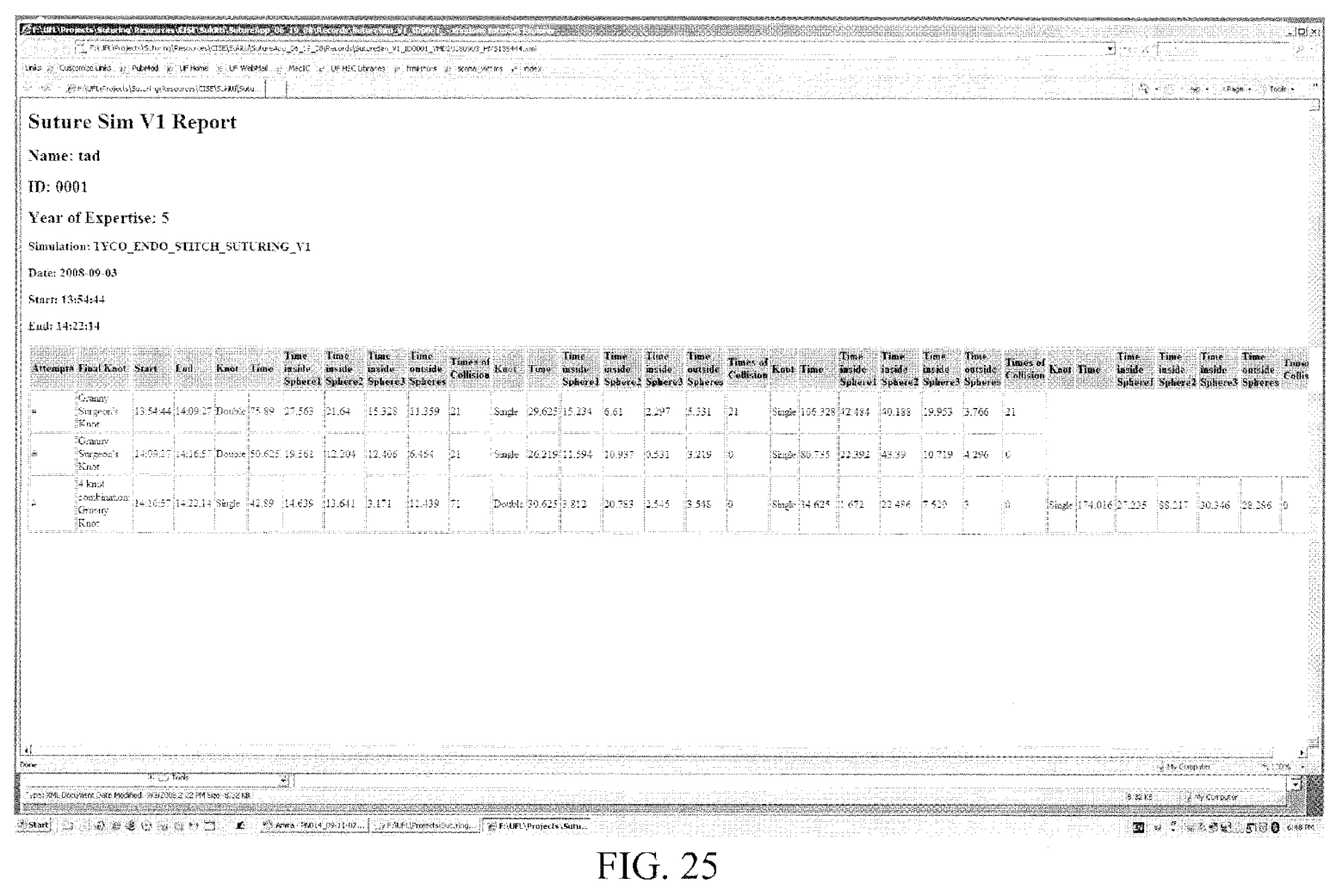

Various other metrics can be used to assess a user's skill. For example, FIG. 25 shows a screen image of a tabular report. Such a report could also be output to a printer. Each row of the report shows the start and end times for the completion of a knot. As shown, some knots are made up of combinations of smaller knots. For each knot and sub-knot, the time for completion is presented. The amount of time spent in each of the three efficiency spheres during the tying of each knot is also presented. Finally, the number of collisions which occurred with other objects during the tying of the knot is shown. These examples are given for illustrative purposes only. Various other formats are contemplated and can be used with the subject invention. As shown in FIG. 1, the results including the final reports can be stored in the computer's memory and can be made available through various sources, such as a web server on the Internet.

Lastly, the virtual coach can also utilize instrument navigation during an exercise to determine proficiency with an instrument. According to this embodiment of the subject invention, the path or routes the instrument(s) take during a training exercise can be recorded in the computer's memory, as shown in FIG. 1. This can be accomplished by, for example, recording the movement signals as they are received from a haptic device. Later the instrument route can be visually displayed for analysis or played back through a haptic device. The routes could then be visually compared to those of an expert user or instructor or evaluated directly by such an expert when played back through a haptic device.

The devices and methods of the subject invention can have innumerable uses for training that permit the repeated performance of maneuvers that accurately simulate an existing or new surgical instrument, or other device, but in a virtual world. The device of the subject invention can also be used to test and refine new devices in the virtual environment before they used in a real environment, surgical or otherwise. Alternative embodiments can also create simulations wherein the motion paths in 3-dimensional space of an experienced surgeon or educator can be recorded and used to later guide a trainee in a virtual environment, allowing the trainee to be guided by the recorded educator's path.

A further alternative embodiment can utilize certain devices and methods of the subject invention to perform procedures at long distance. For example, the modified surgical handle combined with a haptic feedback device can be used to guide an actual instrument's working end mounted, for example, on a movable arm capable of 3-dimensional motion. A surgeon in the next room or across country could utilize the actual instrument handle to send signals to an actual device tip that has been pre-positioned for an endoscopic surgical procedure. This could permit a specialist in one location to perform surgical procedures around the world.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An apparatus for simulating a procedure in a virtual environment comprising:

a handle having a jack connector, such that the handle is interchangeable, and at least one control mechanism thereon for manipulating a virtual representation of a working end of a surgical device, wherein the handle and at least one control mechanism accurately simulate the handle of the surgical device, such that manipulations made with the handle and the at least one control mechanism accurately simulate the maneuvers used to operate the surgical instrument;

at least one sensor operably connected to the control mechanism on the handle, wherein the sensor detects manipulations of the at least one control mechanism;

a haptic device operably connected to the handle by the jack connector, the haptic device capable of receiving information that corresponds to the manipulations of the handle and information received from the at least one sensor and wherein the jack connector provides the handle with up to 360° of rotation about the jack connector; and a display device, on which the virtual representation of the working end is displayed, the display device having an operable connection with the haptic device; such that, information received through the haptic device pertaining to the manipulations of the handle and the at least one control mechanism thereon cause an appropriate change in the virtual representation of the working end to be displayed on the display device, and information corresponding to the change in the virtual representation of the working end is transmitted to the haptic device, which transmits a haptic response that is detectable with the handle and the at least one control mechanism thereon.

2. The apparatus, according to claim 1, wherein the handle simulates a laparoscopic surgical device.

3. The apparatus, according to claim 2, wherein the laparoscopic surgical device is an endoscopic dissector.

4. The apparatus, according to claim 2, wherein the laparoscopic dissector is a dissecting pen.

5. The apparatus, according to claim 2 wherein the laparoscopic surgical device has one or more jaws that open and close to grasp, shear, or dissect tissue.

6. The apparatus, according to claim 1, wherein the haptic device is a desktop model force feedback haptic device.

7. A method for simulating a procedure in a virtual environment utilizing a device comprising:

a handle having a jack connector, such that the handle is interchangeable, and at least one control mechanism thereon for manipulating a virtual representation of a working end of a surgical instrument, wherein the handle and the at least one control mechanism accurately simulate the handle of the surgical instrument, such that manipulations of the handle and the at least one control mechanism thereon accurately simulate the maneuvers used to operate the surgical instrument;

at least one sensor operably connected to the at least one control mechanism on the handle, wherein the sensor detects manipulations of the at least one control mechanism;

a haptic device operably connected to the handle, by the jack connector, and capable of receiving information from the handle and the at least one sensor, wherein the connection of the haptic device to the handle provides the handle with to 360° of rotation about the jack connector; and a display device, in operable connection with the haptic device and on which the virtual representation of the working end is displayed, such that information received from the haptic device pertaining to the manipulations of the handle and the control mechanism cause an appropriate virtual representation of the working end of the device to be displayed, and wherein information corresponding to the virtual representation of the working end can be transmitted to the haptic device causing a haptic feedback that is detectable with the handle and the at least one control mechanism, wherein said method comprises, attaching a handle with a jack connector to the haptic device;

utilizing the handle and the at least one control mechanism thereon to transmit information to the haptic device that manipulates the virtual representation of the working end of the device, receiving information from the haptic feedback device pertaining to the manipulations of the virtual representation of the working end of the device, and responding to the haptic feedback information received by the handle.

8. The method, according to claim 7, wherein the procedure is a laparoscopic surgical procedure.

9. A device for transmitting information to and receiving information from a haptic device, the device comprising:

a handle having at least one control mechanism thereon, wherein the handle simulates a surgical instrument, such that manipulations of the handle and the at least one control mechanism accurately simulate the maneuvers used with the surgical instrument;

at least one sensor operably connected to the control mechanism for translating the manipulations of the control mechanism into information that, when transmitted through the haptic device, causes a corresponding reaction to occur in a virtual representation of a working portion of the surgical instrument; and a jack connector by which the handle is operably connected to the haptic device, such that the handle is interchangeable and the jack connector transmits the information from the handle and the at least one sensor to the haptic device and transmits force feedback information from the haptic device such that the information is detectable with the instrument handle and the at least one control mechanism thereon.

10. The device, according to claim 9, wherein the instrument handle simulates laparoscopic surgical instrument.

11. A method for training or assessing a user on the use of a surgical instrument, the method comprising:

utilizing a handle that is interchangeably and operably connected by a jack connector to a haptic device, the handle having one or more sensors configured to detect one or more operations of one or more control mechanisms on the handle, wherein the handle accurately simulates the handle of a surgical instrument, such that manipulations of the handle and the one or more control mechanisms thereon accurately simulate the maneuvers used to control the surgical instrument;

utilizing the haptic device, to which the handle is operably connected, to interface with a display device for rendering graphics and that comprises a memory, wherein the display device displays the rendered graphics and the memory comprises a definition of at least the shape of the working portion of the surgical instrument to be rendered and displayed and an interface to the one or more sensors;

receiving, by the computer, a movement signal from the haptic device in response to a movement of the handle, wherein a movement signal includes rotation of the handle of up to 360° about the jack connector;

receiving, by the display device, a control signal from one of the one or more sensors in response to one or more manipulations of the one or more control mechanisms;

processing, by the display device, the movement signal to determine a virtual location of the working portion of the surgical instrument to be displayed;

processing, by the display device, the control signal in accordance with the interface to determine a configuration for the display of the working portion of the surgical instrument;

rendering, by the display device, a scene for the configuration and location of the working portion of the surgical instrument; and displaying, by the display device, the rendered scene.

12. The method of claim 11, wherein:

the scene further comprises one or more efficiency areas; and the method further comprises identifying, by the display device, an intersection between the working portion and one or more of the one or more efficiency areas.

13. The method of claim 12, further comprising:

recording in the memory, by the display device, an enter time value representing a time when the working portion entered one of the one or more efficiency areas;

recording in the memory, by the display device, an exit time value representing a time when the working portion exited one of the one or more efficiency areas; and calculating, by the display device, from the enter time and the exit time an amount of time the working portion spent in one of the one or more efficiency areas.

14. A method for training or assessing a user on the use of a knot-tying instrument, comprising:

utilizing an interchangeable handle operably connected by a jack connector to a haptic device, the handle having one or more sensors configured to detect one or more operations of one or more controls on the handle, wherein the handle accurately simulates the handle of a knot-tying surgical instrument, such that operation of the handle and the one or more controls accurately simulate the maneuvers utilized with the knot-tying surgical instrument, and wherein the haptic device is operably connected to a computer customized to render graphics and comprises a memory and a display device for displaying the rendered graphics in response to one or more operations of one or more controls on the handle;

loading into the memory a definition of the knot-tying surgical instrument comprising the shape of the knot-tying surgical instrument, including at least the working tip, and an interface to the one or more sensors;

transmitting to the computer a movement signal from the haptic device in response to a movement of the handle, wherein the movement signal comprises rotation of the handle about the jack connector of up to 360°;

receiving by the computer a control signal from one of the one or more sensors in response to one or more operations of the one or more controls on the handle;

processing by the computer the movement signal to determine at least one of a location and a rotational position of the working tip of the knot-tying surgical instrument;

processing, by the computer, the control signal in accordance with the interface to determine a configuration of the working tip of the knot-tying surgical instrument;

rendering, by the computer, a scene having the configuration and at least one of the location and the rotational position of the working tip of the knot-tying surgical instrument; and displaying the rendered scene on the display device.

15. The method of claim 14, further comprising:

loading into the memory one or more descriptions of one or more additional objects to be displayed in the scene, wherein each description comprises a shape and a location of the additional object and wherein at least one of the additional objects comprises a surgical thread;

processing, by the computer, the movement signal to detect a collision between the instrument and a struck object being one or more of the additional objects;

calculating, by the computer, the direction and magnitude of a force to be applied to the instrument as a result of the collision;

transmitting, by the computer, to the haptic device a force-feedback signal describing a corresponding force to be applied to the handle and the one or more controls thereon;

generating in the haptic device the corresponding force in response to the force-feedback; and applying the corresponding force to the handle and the one or more controls thereon.

16. The method of claim 15, further comprising:

recording in the memory a start time value representing the time a user began tying a knot;

recording in the memory a stop time value representing the time the user completed the knot; and calculating from the start time value and the stop time value an amount of time the user took to complete the knot.

17. The method of claim 15, wherein the surgical thread comprises two or more cylindrical objects in close lateral proximity to each other.

18. The method of claim 17, wherein the two or more cylindrical objects are arranged according to a mass spring model.

* * * * *

UNITED STATES PATENT AND TRADEMARK OFFICE
CERTIFICATE OF CORRECTION

PATENT NO.       : 8,956,165 B2
APPLICATION NO.  : 12/864340
DATED            : February 17, 2015
INVENTOR(S)      : Sergei Kurenov et al.

It is certified that error appears in the above-identified patent and that said Letters Patent is hereby corrected as shown below:

In the Specification

Column 1,
Line 9, "This application claims the benefit of U.S. Provisional Application Serial No. 61/023,709, filed on January 25, 2008, which is hereby incorporated by reference in its entirety, including all tables, figures, and references." should read --This application is the U.S. national stage application of International Patent Application No. PCT/US2009/031963, filed January 26, 2009, which claims the benefit of U.S. Provisional Application Serial No. 61/023,709, filed on January 25, 2008, the disclosures of which are hereby incorporated by reference in their entireties, including all tables, figures, and references.--.

Signed and Sealed this
Fifteenth Day of September, 2015

Michelle K. Lee
*Director of the United States Patent and Trademark Office*